United States Patent
Crush et al.

(10) Patent No.: US 11,608,544 B2
(45) Date of Patent: *Mar. 21, 2023

(54) PROCESS FOR RECOVERING METAL FROM ELECTRONIC WASTE

(71) Applicant: Mint Innovation Limited, Auckland (NZ)

(72) Inventors: Oliver Crush, Auckland (NZ); Reece Whitby, Auckland (NZ); Ryan Smith, Auckland (NZ)

(73) Assignee: MINT INNOVATION LIMITED, Auckland (NZ)

( * ) Notice: Subject to any disclaimer, the term of this patent is extended or adjusted under 35 U.S.C. 154(b) by 195 days.

This patent is subject to a terminal disclaimer.

(21) Appl. No.: 16/756,679

(22) PCT Filed: Oct. 17, 2018

(86) PCT No.: PCT/NZ2018/050144
§ 371 (c)(1),
(2) Date: Apr. 16, 2020

(87) PCT Pub. No.: WO2019/078735
PCT Pub. Date: Apr. 25, 2019

(65) Prior Publication Data
US 2020/0263275 A1    Aug. 20, 2020

(30) Foreign Application Priority Data

Oct. 17, 2017 (NZ) .......................... 736489
Nov. 30, 2017 (NZ) .......................... 737908

(51) Int. Cl.
C22B 11/00    (2006.01)
C22B 1/00    (2006.01)
(Continued)

(52) U.S. Cl.
CPC ............ *C22B 11/046* (2013.01); *C22B 1/005* (2013.01); *C22B 3/02* (2013.01); *C22B 3/18* (2013.01); *C22B 3/24* (2013.01); *C22B 3/33* (2021.05)

(58) Field of Classification Search
CPC ......... C22B 11/046; C22B 1/005; C22B 3/02; C22B 3/18
See application file for complete search history.

(56) References Cited

U.S. PATENT DOCUMENTS 4,293,333 A    10/1981    Drobot
4,769,223 A *    9/1988    Volesky ................. C12N 1/125
                                    423/DIG. 17
(Continued)

FOREIGN PATENT DOCUMENTS

CN    102366716 A    3/2012
CN    104220611 A    12/2014
(Continued)

OTHER PUBLICATIONS

Machine translation of DE4446618A (Year: 1996).*
(Continued)

*Primary Examiner* — Scott R Kastler
(74) *Attorney, Agent, or Firm* — Sughrue Mion, PLLC

(57) ABSTRACT

The invention relates to a method for recovering precious metals from electronic waste utilising biometallurgical techniques. In one aspect, a method of recovering one or more target metals from electronic waste, includes (a) removing at least a portion of non-target material from the electronic waste or grinding to a preselected size particle to give pre-processed electronic waste; (b) contacting the pre-processed electronic waste with a lixiviant such that at least a portion of the target metal(s) dissolve into the lixiviant to produce a pregnant solution; (c) contacting a microorganism with the pregnant solution such that at least a portion of the (Continued)

target metal(s) ions biosorb to the microorganism wherein the microorganism becomes metal laden and the pregnant solution becomes barren; (d) substantially separating the metal laden microorganism from the barren solution; and (e) recovery of the target metal(s) from the metal laden microorganism.

15 Claims, 2 Drawing Sheets

(51) Int. Cl.
    *C22B 3/02*         (2006.01)
    *C22B 3/18*         (2006.01)
    *C22B 3/26*         (2006.01)
    *C22B 3/24*         (2006.01)

(56) References Cited

U.S. PATENT DOCUMENTS

| | | | |
|---|---|---|---|
| 4,992,179 | A | 2/1991 | Brierley et al. |
| 5,152,969 | A | 10/1992 | Kleid et al. |
| 5,462,720 | A | 10/1995 | Aragones |
| 5,914,441 | A | 6/1999 | Hunter et al. |
| 2004/0197249 | A1 | 10/2004 | Wan et al. |
| 2011/0308355 | A1 | 12/2011 | Kato et al. |
| 2012/0024795 | A1 | 2/2012 | Tadic et al. |
| 2014/0144292 | A1 | 5/2014 | Konishi et al. |
| 2015/0329935 | A1 | 11/2015 | Terashi et al. |
| 2019/0292627 | A1* | 9/2019 | Barker ............... C22B 11/04 |
| 2020/0048732 | A1* | 2/2020 | Barker ............... C02F 1/286 |
| 2020/0263275 | A1* | 8/2020 | Crush ................. C22B 3/18 |

FOREIGN PATENT DOCUMENTS

| | | | | |
|---|---|---|---|---|
| CN | 104312955 A | 1/2015 | | |
| CN | 106086417 A | 11/2016 | | |
| DE | 4446618 A1 * | 6/1996 | ............ | B03B 9/061 |
| EP | 0 181 497 A1 | 5/1986 | | |
| EP | 0 432 935 A1 | 6/1991 | | |
| EP | 2 813 585 A1 | 12/2014 | | |
| EP | 3 162 905 A1 | 5/2017 | | |
| JP | 61-158796 A | 7/1986 | | |
| JP | 2004-180582 A | 7/2004 | | |
| WO | 96/00308 A2 | 1/1996 | | |
| WO | 2009/130006 A1 | 10/2009 | | |
| WO | 2014/112637 A1 | 7/2014 | | |
| WO | 2016/156409 A | 10/2016 | | |
| WO | 2018/080326 A1 | 5/2018 | | |
| WO | 2018/084723 A2 | 5/2018 | | |

OTHER PUBLICATIONS

International Search Report in International Application No. PCT/NZ2018/050144, dated Dec. 18, 2018.
Deepak Pant et al., "Chemical and biological extraction of metals present in E waste: A hybrid technology", Waste Management, May 2012, vol. 32, No. 5, pp. 979-990 (12 pages total).
Written Opinion in International Application No. PCT/NZ2018/050144, dated Dec. 18, 2018.
International Search Report dated Jan. 16, 2018 in International Application No. PCT/NZ2017/050142.
Extended European Search Report dated Jul. 20, 2022 in European Application No. 18867926.0.
Extended European Search Report dated Mar. 19, 2020 in European Application No. 17863691.6.
Extended European Search Report dated Nov. 22, 2019 in European Application No. 17866561.8.
Creamer et al., "Palladium and gold removal and recovery from precious metal solutions and electronic scrap leachates by *Desulfovibrio desulfuricans*", Biotechnol Lett, 2006, vol. 28, pp. 1475-1484 (10 pages total).
Bhat et al., "Development of an integrated model to recover precious metals from electronic scrap—A novel strategy for e-waste management", Procedia—Social and Behavioral Sciences, 2012, vol. 37, pp. 397-406 (10 pages total).
Cui et al., "Metallurgical recovery of metals from electronic waste: A review", Journal of Hazardous Materials, 2008, vol. 158, pp. 228-256 (29 pages total).
Jones et al., "Gold in Minerals and the Composition of Native Gold", Geological Survey Circular 612, U.S. Department of the Interior, 1969, pp. 1-17 (24 pages total).
Bejor et al., "Low-cost harvesting of microalgae biomass from water", International Journal of Development and Sustainability, 2013, vol. 2, No. 1, pp. 1-11 (11 pages total).
"Aureobasidium", NCBI Taxonomy Browser, Viala & G. Boyer, 1891 (2 pages total).

* cited by examiner

PROCESS FOR RECOVERING METAL FROM ELECTRONIC WASTE

CROSS REFERENCE TO RELATED APPLICATIONS

This application is a National Stage of International Application No. PCT/NZ2018/050144 filed Oct. 17, 2018, claiming priority based on New Zealander Patent Application No. 736489 filed Oct. 17, 2017 and New Zealander Patent Application No. 737908 filed Nov. 30, 2017.

FIELD OF INVENTION

The invention relates to a process for recovering at least one precious metal from electronic waste. In particular, biometallurgical techniques are utilised during the process.

BACKGROUND

There is an abundance of materials containing trace metals throughout the world, including aqueous solutions and solid materials. However, due to the relative scarcity of the metal component relative to the non-metal matrix, recovering these metals in efficient, environmentally safe ways is extremely challenging. For example, the removal of toxic metal ions from aqueous liquid waste streams is a significant challenge for a wide range of industries.

Similarly, as ore grades for the mining and refining of virgin metals decrease, increased interest is being shown in obtaining metals from sources such as low-grade mining ores, smelter tailings and electronic waste. Recovering metals from these feedstocks, however, is often economically prohibitive. Factors that influence the viability of any recovery process include the metal concentration of a feedstock (and hence the amount of feedstock required for processing); the presence of impurities such as other metals or refractory materials; and the volume of effluent generated. There is therefore a place for alternative solutions that aim to mitigate at least some of these problems, thereby improving the economics for the recovery of metals from low-grade or recalcitrant feedstocks.

Traditional techniques for refining metals include pyrometallurgy and hydrometallurgy. In pyrometallurgy, a feedstock is smelted at high temperature (typically in the presence of a suitable reductant and/or catalyst). This requires a non-trivial energy input (and associated emissions), and therefore there is a practical minimum metal concentration required in a feedstock. In hydrometallurgy, the feedstock is treated with a lixiviant solution that leaches the desired metal (specifically or otherwise) into an ionic or complexed soluble form. Subsequent steps are required to recover the target metal(s) from solution (e.g. electrowinning). Depending on the temperature and pressure requirements for leaching, this approach may allow for lower grade feedstocks to be processed in comparison to pyrometallurgy. Consideration needs to be made for the possible use of corrosive (e.g. acidic) or toxic (e.g. cyanide) solutions; any consumption of solution components during feedstock treatment; and dealing suitably with waste effluent. Pyrometallurgy and hydrometallurgy techniques are not mutually exclusive, and may be used sequentially over multiple steps to refine specific metals.

Recovery of gold from gold containing ores is a typical example of a hydrometallurgical approach that has a number of issues. The amount of gold in gold bearing ores has been declining for over a hundred years as easier to recover resources with higher gold content have been depleted through extensive mining. As such, hydrometallurgical techniques have been used to recover traces of gold from large volumes of rock. Cyanide-based lixiviants have been successfully employed for many years, but suffer from toxicity issues and challenges with processing certain ore types.

Waste electrical and electronic equipment, such as printed circuit boards from computers, cell phones, notebooks and LCD displays, represents a large target for metal recovery systems. Approximately 41.8 million tonnes of electronic waste (e-waste) was generated worldwide in 2014; this is forecast to increase to 50 million tonnes by 2018 (Baldé et al, The global e-waste monitor—2014, United Nations University, IAS—SCYCLE, Bonn, Germany (2015)). On a per weight basis, this e-waste contains high amounts of valuable base and precious metals (including gold) in comparison to virgin ore. Recovering metals from this feedstock is attractive because the mining and refining processes used to obtain virgin metals consumes energy and water resources (and generates related carbon emissions); recycling means that these costs need not be borne again. As an example, recycling copper requires 85% less energy than producing virgin material from ore (Khaliq et al, Resources 3, pp 152-179 (2014)).

Waste electronic equipment, such as printed circuit boards from computers, cell phones, notebooks and LCD displays also contain an appreciable amount of precious metals (including gold). While much endeavour has been applied to recovering gold and other metals from e-waste using pyrometallurgy or hydrometallurgy approaches, sustainable success has yet to be achieved. Pyrometallurgy approaches commonly involve incinerating circuit boards to liberate and fractionate metals—this is energy and capital intensive, and produces dangerous gases such as dioxins. Hydrometallurgy approaches commonly involve using strong acids or cyanide-based solutions to leach metals—this is highly toxic, expensive and can be non-recyclable. The heterogeneity of e-waste as a feedstock also makes it difficult to economically apply these existing technologies.

Biometallurgy is a more recent approach that uses microorganisms to expose, leach, bind and/or recover metals from a feedstock under ambient conditions (Zhuang et al, Current Opinion in Biotechnology 33, pp 327-335 (2015)). Using microorganisms may lower the minimum required grade of a feedstock further, or better enable the economic processing of feedstocks that are complex mixtures or refractory to pyrometallurgy and/or hydrometallurgy processes. A common tradeoff, however, is reaction time: biometallurgy often requires weeks to years to recover a metal from a feedstock (e.g. bio-oxidation of refractory copper ores using sulfur reducing bacteria).

It is an object of the present invention to provide a method of recovering precious metals from electronic waste using biometallurgical techniques that complement or replace traditional pyrometallurgy and hydrometallurgy approaches. It is anticipated that this will lead to the capture of value from low-grade or waste streams of metal that are currently neglected, or to at least provide the public with a useful choice in this regard. It is an alternative object of the invention to provide a method of recovering one or more target metals from electronic waste, and/or a target metal recovered by the method and/or a system for the recovery of target metal, or at least provide the pubic with a useful choice.

SUMMARY OF THE INVENTION

The present invention responds to a need in the art. The present invention provides methods for recovering at least one precious metal from electronic waste.

In a first aspect, the invention provides a method of recovering one or more target metal(s) from electronic waste, the method comprising:
   (a) a pre-processing step comprising removing at least a portion of non-target material from the electronic waste or grinding to a preselected size particle to give pre-processed electronic waste;
   (b) a dissolving step comprising contacting the pre-processed electronic waste with a lixiviant such that at least a portion of the target metal(s) dissolve into the lixiviant to produce a pregnant solution;
   (c) a biosorption step comprising contacting a microorganism with the pregnant solution such that at least a portion of the target metal(s) ions biosorb to the microorganism wherein the microorganism becomes metal laden and the pregnant solution becomes barren;
   (d) a separating step comprising substantially separating the metal laden microorganism from the barren solution; and
   (e) a recovery step comprising recovery of the target metal(s) from the metal laden microorganism.

In particular embodiments, the target metal is gold.

In certain embodiments the electronic waste comprises less than 5%, or less than 1%, or less than 0.1%, or less than 0.01%, or less than 0.001%, or less than 0.0001% of the target metal.

In particular embodiments the pre-processing step comprises one or more unit operations selected from:
   chip removal
   grinding to a preselected size
   removal of certain density fractions
   removal of magnetic material
   base metal leach.

In particular embodiments, the pre-processing step includes at least one of the unit operations. In another embodiment, the pre-processing step includes at least two of the unit operations. In another embodiment the pre-processing step includes at least three of the unit operations. In another embodiment, the pre-processing step includes at least four of the unit operations.

In particular embodiments the pre-processing step removes at least a portion of non-target material from the electronic waste to give pre-processed electronic waste.

In particular embodiments the pre-processing step includes base metal leach.

In particular embodiments the pre-processing step includes grinding and base metal leach.

In particular embodiments the pre-processing step removes at least 50% of the non-target material prior to the target metal recovery, or at least 60%, or at least 70%, or at least 80%, or at least 90%, or at least 95%. In particular preferred embodiments, the pre-processing step removes less than 20%, or less than 10%, or less than 5%, or less than 2%, or less than 1% of the target metal(s).

In particular embodiments the non-target material includes one or more non-target metal(s). In particular embodiments the non-target metal(s) is a base metal(s). In particular embodiments the pre-processing step removes at least a portion of the non-target metal(s). In particular embodiments the pre-processing step removes at least 50% of the non-target metal prior to the target metal recovery, or at least 60%, or at least 70%, or at least 80%, or at least 90%, or at least 95%.

In particular embodiments chip removal comprises at least the partial removal of solder used to fix the chip to the printed circuit board through elevating the temperature of the solder above the melting point of the solder or by dissolving the solder in a suitable solvent. In particular embodiments the solder comprises non-target material(s). In particular embodiments the solder comprises non-target metal(s). In particular embodiments the solder comprises base metal(s).

In particular embodiments the pre-processing step comprising grinding to a preselected average size wherein the preselected size is an average of about 10 to 0.05 mm diameter. In particular embodiments the preselected size is an average of about 5 to 0.1 mm diameter.

In particular embodiments grinding includes use of any one or more of hammer mills, ball mills, ring mills, shredders and cutters.

In particular embodiments pre-processing step comprising grinding and separating particles substantially above the preselected maximum size. In particular the maximum size is about less than 10 cm, or less than 8 cm, or less than 5 cm, or less than 3 cm, or less than 1 cm.

In particular embodiments the base metal leach comprises treating the e-waste with a leaching agent comprising nitric acid, sulfuric acid, and/or hydrochloric acid. In particular embodiments the base metal leach comprises treatment of the e-waste with a leaching agent comprising sulphuric acid. In particular embodiments the leaching agent comprises sulphuric acid and an oxidant. In particular embodiments the oxidant is selected from hydrogen peroxide, potassium peroxymonosulphate, ozone, oxygen gas or air (containing oxygen). In particular embodiments the leaching agent comprises sulphuric acid and hydrogen peroxide.

In particular embodiments removal of magnetic material comprises applying a magnetic field.

In particular embodiments removal of certain density fractions comprises separating the electronic waste into fractions using floatation, shaker tables and/or electrostatic separation.

In particular embodiments the pregnant solution contains between about 0.1 ppm to 1500 ppm, or between about 0.1 ppm to 1000 ppm, or between about 0.1 ppm to 500 ppm, or between about 0.1 ppm to 200 ppm, or between about 0.1 ppm to 100 ppm, or between about 0.1 ppm to 50 ppm, or between about 0.1 ppm to 20 ppm of the target metal. Preferably the pregnant solution contains between about 0.5 ppm to 1500 ppm, or between about 0.5 ppm to 1000 ppm, or between about 0.5 ppm to 500 ppm, or between about 0.5 ppm to 200 ppm, or between about 0.5 ppm to 100 ppm, or between about 0.5 ppm to 50 ppm, or between about 0.5 ppm to 20 ppm of the target metal(s). Preferably the pregnant solution contains between about 1 ppm to 1500 ppm, or between about 1 ppm to 1000 ppm, or between about 1 ppm to 500 ppm, or between about 1 ppm to 200 ppm, or between about 1 ppm to 100 ppm, or between about 1 ppm to 50 ppm, or between about 1 ppm to 20 ppm of the target metal(s).

In certain embodiments the lixiviant dissolves at least 50%, or at least 60%, or at least 70%, or at least 80%, or at least 90% of the target metal(s) from the electronic waste. In particular embodiments, the lixiviant dissolves 95-99.5% of the target metal(s).

Preferably the electronic waste comprises printed circuit boards (PCB's). Preferably the PCB's comprise at least 10 ppm, or at least 20 ppm, or at least 50 ppm, or at least 100 ppm, or at least 200 ppm, or at least 300 ppm, or at least 400 ppm, or at least 500 ppm target metal. Since PCB's contain a plurality of metals including base metals and target metals, it is recognised there is substantial benefit in using a lixiviant that dissolves the target metal selectively over other non-target metals. However, since precious metals (target metal(s)) are typically less reactive than base metals it is recognised that selectivity may be low.

In particular embodiments, the target metal(s) and non-target materials are substantially selectively dissolved by the lixiviant. In particular embodiments, the target metal(s) and non-target materials are substantially selectively dissolved by the lixiviant in a ratio of greater than 1:1000 (target metal:non-target material), or greater than 1:500, or greater than 1:200, or greater than 1:100, or greater than 1:50, or greater than 1:20, or greater than 1:10, or greater than 1:5, or greater than 1:2, or greater than 1:1.

In particular embodiments the non-target material is a non-target metal. In particular embodiments the non-target metal is base metal. In particular embodiments the target metal(s) and non-target metal(s) are substantially selectively dissolved by the lixiviant. In particular embodiments, the target metal(s) and non-target metal(s) are substantially selectively dissolved by the lixiviant in a ratio of greater than 1:1000 (target metal:non-target material), or greater than 1:500, or greater than 1:200, or greater than 1:100, or greater than 1:50, or greater than 1:20, or greater than 1:10, or greater than 1:5, or greater than 1:2, or greater than 1:1.

In certain embodiments the lixiviant solution is a thiourea-based aqueous solution, or a thiosulphate-based aqueous solution, or a thiocyanate-based aqueous solution, or a cyanide-based aqueous solution, or a halogen-based aqueous solution, or an aqua regia-based solution. In particular embodiments, the lixiviant comprises a chloride source. In particular embodiments, the lixiviant comprises a chloride source and an oxidant. In particular embodiments, the lixiviant comprises a water miscible solvent, an oxidant and an acid—as specified by Foley et al in WO2016/168933 (incorporated herein by reference). In particular embodiments, the lixiviant comprises a halogen solution, or a acetic acid and chlorine, or hydrochloric acid and peroxide.

In particular embodiments in the biosorption step the microorganism is in contact with the pregnant solution for between about 0.5 and 48 hours. In particular embodiments between about 0.5 and 24 hours, or between about 0.5 and 12 hours, or between about 0.5 and 4 hours, or between about 1 and 3 hours.

In particular embodiments the barren solution contains less than 0.1 ppm, or less than 1 ppm, or less than 2 ppm, or less than 5 ppm, or less than 10 ppm, or less than 20 ppm, or less than 50 ppm, or less than 100 ppm of the target metal. In particular embodiments the barren solution contains between about 0.001 and 100 ppm, or between about 0.001 and 50 ppm, or between about 0.001 and 50 ppm, or between about 0.01 and 50 ppm of the target metal(s).

In particular embodiments the pregnant solution contains at least 10 times more target metal than the barren solution. In particular embodiments the pregnant solution contains at least 20 times, or at least 40 times, or at least 45 times or at least 50 times more target metal than the barren solution.

In particular embodiments the metal laden microorganism includes greater than 100 ppm, or greater than 200 ppm, or greater than 500 ppm or greater than 1,000 ppm or greater than 30,000 ppm of the target metal.

In particular embodiments the concentration factor of the target metal from the pregnant solution to the microorganism is greater than 5 or greater than 10, or greater than 20, or greater than 50, or greater than 100, or greater than 900.

In particular embodiments the biosorption step is carried out at ambient temperature, for example between about 15 and 30° C.

In particular embodiments the microorganism is an algae or bacteria. In particular embodiments the microorganism is a Gram-negative or Gram-positive bacteria. In particular embodiments the microorganism is of the genus *Pseudomonas, Escherichia, Bacillus, Desulfovibrio, Plectonema, Cupriavidus, Clostridium* or *Delftia*.

In particular embodiments where the target metal is gold the microorganism is selected from *Cupriavidus metallidurans, Delftia acidovorans, Pseudomonas aeruginosa, P. putida, Desulfovibrio desulfuricans, Bacillus subtilis,* or *Plectonema boryanum*.

In particular embodiments where the target metal is gold the microorganism is selected from environments in which gold is found in physiologically relevant concentrations. In particular embodiments the microorganism is selected from *Cupriavidus metallidurans* or *Delftia acidovorans*.

In particular embodiments the biosorption step is at least partially selective.

In certain embodiments the microorganism selectively biosorbs the target metal(s). In particular embodiments the target metal(s) and non-target material are biosorbed by the microorganism in a ratio of at least 1:1 (target metal:non-target material), or at least 5:1, or at least 10:1, or at least 20:1, or at least 50:1 or at least 100:1, or at least 200:1, or at least 500:1, or at least 1000:1, or at least 5000:1, or at least 10000:1. In particular embodiments, the microorganism biosorbs target metal and substantially no non-target material.

In certain embodiments where the non-target material includes one or more non-target metal(s) the microorganism selectively biosorbs the target metal(s) over the non-target material. In a particular embodiment, the pregnant solution includes at least one further metal (the non-target metal), in addition to the target metal. In particular embodiments the microorganism preferentially biosorbs the target metal over the further metal (non-target metal) in the biosorption step and the further metal (non-target metal) remains in the barren solution in the separating step. In particular embodiments the microorganism preferentially biosorbs the target metal over the further metal (non-target metal) in the biosorption step such that the mass ratio of target metal to further metal (non-target metal) in the microorganism increases by a factor of at least 2 when compared to the mass ratio in the pregnant solution. In particular embodiments the mass ratio increased by a factor of at least 3, or at least 5, or at least 8, or at least 10, or at least 20, or at least 50, or at least 100, or at least 200. In particular embodiments the target metal is gold. In particular embodiments the further metal (non-target metal) is selected from one or more of copper and nickel.

In particular embodiments the target metal(s) and non-target metal(s) are biosorbed by the microorganism in a ratio of at least 1:1 (target metal(s): non-target metal(s)), or at least 5:1, or at least 10:1, or at least 20:1, or at least 50:1 or at least 100:1, or at least 200:1, or at least 500:1, or at least 1000:1, or at least 5000:1, or at least 10000:1. In particular embodiments, the microorganism biosorbs target metal and substantially no non-target metal.

In particular embodiments, the invention comprises at least a partially selective dissolving step and at least a partially selective biosorption step.

In certain embodiments, the dissolution step and biosorption step may occur in the same vessel.

In certain embodiments, the separation step includes at least one of:
  gravity separation of the metal laden microorganism from the barren solution and removal of the barren solution;
  centrifugation and removal of the barren solution;

filtration of the metal laden microorganism from the barren solution.

In certain embodiments, the separating step comprises gravity separation of the metal laden microorganism from the barren solution, wherein at least 50% of the barren solution is removed. In particular embodiments at least 60%, or at least 70%, or at least of 80%, or at least 90%, or at least 95% of the barren solution is removed.

In certain embodiments, the separating step comprises separating the metal laden microorganism by centrifugation, wherein during the centrifugation at least 50% of the barren solution is removed from the metal laden microorganism. In particular embodiments at least 60%, or at least 70%, or at least of 80%, or at least 90%, or at least 95% of the barren solution is removed during centrifugation.

In certain embodiments, the separating step comprises separating the metal laden microorganism by filtration, wherein during the filtration at least 50% of the barren solution is removed from the metal laden microorganism. In particular embodiments at least 60%, or at least 70%, or at least of 80%, or at least 90%, or at least 95% of the barren solution is removed during filtration.

In certain embodiments the separating step includes drying the microorganism.

In another embodiment the invention comprises a recycling step, wherein at least a portion of barren solution can be used as lixiviant or partially used as lixiviant in the dissolving step.

It is appreciated that the barren solution may contain metal ions and in some instances may even include target metal ions. In some embodiments the barren solution may be treated to remove excess metal ions or other compounds prior to returning to the dissolving step. In some embodiments, at least a portion of the barren solution is mixed with makeup water prior to returning to the dissolving step.

It is further recognised that additional components may need to be added to the barren solution such that it can act as a lixiviant and dissolve target metal(s). For example, in certain embodiments where the lixiviant is thiosulfate or cyanide or thiourea or chlorine, the active lixiviant agent(s) may need to be at least partially recharged to enable further dissolution of the target metal(s). In certain embodiments, these additional components are added to the barren solution prior to returning to the dissolving step. By way of non-limiting example, additional oxidant and/or additional acid or base and/or additional counter ion may need to be added. Additionally or alternatively, the barren solution may need to be treated to adjust the pH, the ORP, the temperature or any other physical properties that might be known to those skilled in the art in order to make it a suitable lixiviant.

In particular embodiments at least 25% of the barren solution is returned to the dissolving step. In other embodiments, at least 35%, or at least 45%, or at least 55%, or at least 65%, or at least 75%, or at least 85%, or at least 95% of the barren solutions is returned to the dissolving step.

In an alternative embodiment, the separated barren solution may at least partially be recycled for use in cultivating the microorganism. In certain embodiments additional components may need to be added to the barren solution such that it can act as a suitable cultivation media in a bioreactor. In certain embodiments, these additional components are added to the barren solution prior to passing to the bioreactor. In alternative embodiments, the additional components are added to the barren solution in the bioreactor. Additionally or alternatively, the barren solution may need to be treated to adjust the pH, the ORP, the temperature or any other physical properties that might be known to those skilled in the art in order to make it a suitable cultivation media.

In certain embodiments, at least 25% of the barren solution is passed to the bioreactor. In other embodiments, at least 35%, or at least 45%, or at least 55%, or at least 65%, or at least 75%, or at least 85%, or at least 95% of the barren solutions is passed to the bioreactor.

In certain embodiments, when the lixiviant comprises a carbon source suitable as a growth media for cultivating a microorganism, the pregnant solution may be passed to a vessel configured for cultivating the microorganism and contacting said microorganism with the pregnant solution such that the microorganism become metal laden.

In particular embodiments, the lixiviant comprises acetic acid.

In certain embodiments, the recovery step comprises contacting the metal laden microorganism with a condition which triggers the microorganism to substantially desorb the target metal(s).

In particular embodiments, the condition is a solution containing a compound that triggers desorption of the target metal. In particular embodiments, the desorb solution contains one or more of a compound that desorbs the target metal(s). In particular embodiments, the desorb solution contains cysteine, or thiosulphate, or thiourea.

Additionally or alternatively, the condition triggers desorption of the target metal (in metallic or ion form). By way of example, the desorb solution comprises conditions that trigger the desorption of the target metal(s) or metal ions. By way of example, the conditions may be of pH less than 5, or pH less than 4, or pH less than 3, or pH less than 2. may be of pH less than 5, or pH less than 4, or pH less than 3, or pH less than 2. Alternatively the conditions may be between pH 1 and 5, or between pH 2 and 5, or between 2 and 4. By way of further example, the conditions may be pH greater than 8, or pH greater than 9, or pH greater than 10, or pH greater than 11, or pH greater than 12. Alternatively may be between pH 8 and 13, or between pH 9 and 13, or between 10 and 13. Additionally or alternatively, the conditions may be at an oxidation-reduction potential suitable for desorption of the target metal(s).

Alternatively, the recovery step includes burning or chemical dissolution of the metal laden microorganism to desorb the target metal(s).

In certain embodiments the method includes a filtering step following the dissolving step to remove at least a portion of undissolved non-target material from the pregnant solution.

In a second aspect, there is provided a target metal recovered by the method of the first aspect. In particular embodiments the metal is gold.

In a third aspect, there is provided a system for the recovery of target metal from electronic waste, the system comprising:

(a) a pre-processing means configured to remove at least a portion of non-target material from the electronic waste or grinding to a preselected size particle to provide pre-processed electronic waste;

(b) a vessel configured for contacting the pre-processed electronic waste with a lixiviant such that at least a portion of one or more target metal(s) dissolve to produce a pregnant solution;

(c) a vessel configured for contacting a microorganism with the pregnant solution such that at least a portion of the target metal(s) biosorb to the microorganism, wherein the microorganism becomes metal laden, and the pregnant solution becomes barren;

(d) a separator configured for substantially separating the metal laden microorganism from the barren solution; and (e) optionally, a recovery means configured for recovery of the target metal(s) from the metal laden microorganism.

In certain embodiments the system includes means for passing the pre-processed electronic waste to the vessel in (b). In certain embodiments the means in (a) ins in the vessel in (b). In certain embodiments the system includes means for passing the pregnant solution from the vessel in (b) to the vessel in (c). In certain embodiments the vessel in (b) is the same as or part of the vessel in (c). In another embodiment the system includes means for passing the barren solution containing metal laden microorganism from the vessel in (c) to the separator (d). In certain embodiments the system includes means for passing the separated metal laden microorganism in (d) to the recovery means in (e).

In certain embodiments the separator comprises means for gravity separating the metal laden microorganism from the barren solution wherein at least a portion of the barren solution is removed from the metal laden microorganism.

In certain embodiments the separator comprises means for separating the metal laden microorganism by centrifugation, wherein at least a portion of the barren solution is removed from the metal laden microorganism.

In certain embodiments the separator comprises means for separating the metal laden microorganism by filtration, wherein at least a portion of the barren solution is removed from the metal laden microorganism.

In certain embodiments the separator comprises means for gravity separating the metal laden microorganism from the barren aqueous and removing at least a portion of the barren solution.

In certain embodiments the separator comprises means for separating the metal laden microorganism by centrifugation, wherein at least a portion of the barren solution is removed from the metal laden microorganism.

In certain embodiments the separator comprises means for separating the metal laden microorganism by filtration, wherein at least a portion of the barren solution is removed from the metal laden microorganism.

In certain embodiments the recovery means includes an element for contacting the metal laden microorganism with a solution.

In certain embodiment the recovery means includes an element for burning the metal laden microorganism to release the target metal.

In particular embodiments the pre-processing means comprises means for one or more unit operations including but not limited to:

chip removal
grinding to a preselected size
removal of certain density fractions
removal of magnetic material
base metal leach.

In particular embodiments the pre-processing means includes at least one of the unit operations. In another embodiment, the pre-processing step includes at least two of the unit operations. In another embodiment the pre-processing step includes at least three of the unit operations. In another embodiment, the pre-processing step includes at least four of the above unit operations.

In particular embodiments the pre-processing step removes at least 50% of the non-target materials prior to the target metal recovery, or at least 60%, or at least 70%, or at least 80%, or at least 90%, or at least 95%. In particular preferred embodiments the pre-processing step removes less than 20%, or less than 10%, or less than 5%, or less than 2%, or less than 1% of the target metal(s).

In particular embodiments of the various aspects of the invention, the microorganism are bacteria, or algae or fungi. Those skilled in the art will recognise that a number of microorganisms are capable of metal ion biosorption. In particular embodiments the microorganism is a Gram-negative or Gram-positive bacteria. Examples include the Gram-negative bacteria *Pseudomonas aeruginosa* and *Escherichia coli*, the Gram-positive bacterium *Bacillus subtilis*, and the fungi *Saccharomyces cerevisiae*. Nancharaiah et al (*Trends in Biotechnology* 34, pp 137-155 (2016)) identifies the wide range of microorganisms that may be employed to biosorb target metal(s) in accordance with the methods of the invention, all of which are incorporated by reference.

In particular embodiments wherein the target metal ion is gold, the microorganism may be selected from the Gram-negative bacteria *Pseudomonas aeruginosa, P. putida* and *Desulfovibrio desulfuricans*, Gram-positive *Bacillus subtilis*, and the algae *Plectonema boryanum*. In certain preferred embodiments the microorganism is selected from environments in which gold is found in physiologically relevant concentrations, such as the Gram-negative bacteria *Cupriavidus metallidurans* and *Delftia acidovorans*.

Additionally or alternatively, a mixture of microorganism species may be used.

In particular embodiments the microorganism is selected from environments where the target metal is found in physiologically relevant amounts.

The invention may also be said broadly to consist in the parts, elements and features referred to or indicated in the specification of the application, individually or collectively, in any or all combinations of two or more of said parts, elements or features, and where specific integers are mentioned herein which have known equivalents in the art to which the invention relates, such known equivalents are deemed to be incorporated herein as if individually set forth.

BRIEF DESCRIPTION OF THE FIGURES

These and other aspects of the present invention, which should be considered in all its novel aspects, will become apparent from the following description, which is given by way of example only, with reference to the accompanying figures, in which.

DETAILED DESCRIPTION

Definitions

Figure 1:
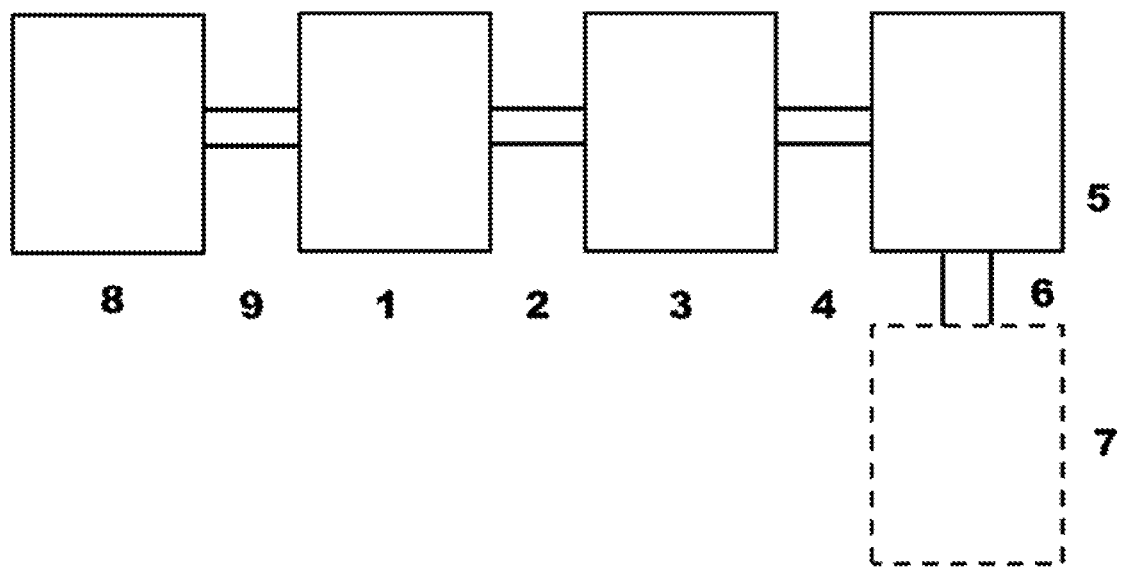
FIG. 1 represents a method of recovering one or more target metals from electronic waste in accordance with the first aspect of the invention or a system configured for the recovery of target metal from electronic waste in accordance with the third aspect of the invention.

The term "target metal" includes both elemental metal and ions of a particular target metal or a plurality of particular metals. It is recognised that a particular target metal may exist in different ionic states (including elemental form) or a plurality of ionic states in different parts of the methods or systems of the invention. The target metal may be dissolved or partially dissolved in the aqueous solutions of the invention, either as an ion (or ions), salts or complex or elemental form or a combination thereof. Similarly, the target metal may exist in solid form either as an ion (or ions), salts or complex or elemental form or a combination thereof as the context dictates.

The term "non-target material" refers to materials from electronic waste that are not immediately desired for recovery. The non-target material may contain metals and/or non metals that are not target metal(s) and may include epoxy, glass fibre, base metals.

The term "base metal" refers to metal(s) in similar states of matter as per the term "target metal" above, but are not precious metals. A non-exhaustive list of examples of base metals include copper, tin, nickel, lead, iron and zinc. Other base metals known to a person skilled in the art would comprise aluminium, tungsten, molybdenum, tantalum, cobalt, bismuth, cadmium, titanium, zirconium, antimony, manganese, beryllium, chromium, germanium, vanadium, gallium, hafnium, indium, niobium, rhenium and thallium.

The term "pregnant solution" refers to an aqueous solution containing dissolved target metal. In some extreme instances a pregnant solution may also contain at least some undissolved target metal(s) and/or non-target metal.

The term "barren solution" refers to an aqueous solution containing a depleted amount of dissolved target metal compared with the pregnant solution. It is recognised that in extreme cases the target metal(s) may be completely absent in the barren solution.

The term "contacting" refers to the mixing and interaction between two or more solutions or substances. One example of this is the contact between a pregnant solution and a microorganism. A further example of this is the contact between a lixiviant and a solid feedstock material.

The terms "biosorb" and "biosorbent" and "biosorption" and the like, when used in relation to the methods and systems of the invention, refers to the microorganism(s) being used to adsorb, adsorp or absorb metal, or the process of metal adsorbing, adsorping or absorbing to the microorganism(s).

The term "microorganism" refers to algae or bacteria or fungi or protoctist or archaea. It may be used in the plural sense for a mixture of microorganisms.

The term "metal laden microorganism" means a microorganism that has biosorbed one or more target metals.

The term "ppm" refers to parts per million and relates to the concentration of a substrate in comparison to another substrate. It refers to the weight:weight ratio between the two substrates. For an aqueous solution ppm and mg/L are approximately equivalent.

The term "rcf" means relative centrifugal force.

The term "decanted" or "decant" or the like refers to the removal of the upper portion of aqueous solution from a solid/liquid mixture in which the solid fraction has been allowed to settle.

The term "lixiviant" refers to an aqueous solution that is capable of dissolving a target metal(s) into an aqueous form.

The term "e-waste" and "electronic waste" refers to electronic waste or waste electrical and electronic equipment (commonly referred to as WEEE).

The term "PCB" means printed circuit board, a form of electronic waste.

The term "selectivity" refers to the ability for a lixiviant and/or microorganism to favourably dissolve and/or biosorb one or more metals over other metals or non-target material present in a sample and/or solution.

A "system" comprises pipework and other features that would be typically employed to enable the extraction of metals from a feedstock. By way of example, the "system" may include vessels, conduits, pumps, pressure valves, heat exchangers, filters, instrumentation (pressure sensors, flow sensors, pH sensors) and mixing tees (static mixers).

Discussion

While the following description focuses on particular embodiments of the invention, namely the recovery of gold from pregnant solutions or solid feedstock material, it should be appreciated that the invention may be applicable to production of alternative target metals as will be known by persons of ordinary skill in the art to which the invention relates.

As discussed hereinbefore, the inventors have devised methods for recovering metals from aqueous solutions containing metal ions and/or solid feedstock materials. In particular, the present invention provides methods for recovering metals from aqueous solutions in a manner that has a number of cost and environmental advantages over existing methods.

In a particular aspect of the invention there is provided a method of recovering one or more target metal(s) from electronic waste, the method comprising:
  (a) a pre-processing step comprising removing at least a portion of non-target material from the electronic waste to give pre-processed electronic waste;
  (b) a dissolving step comprising contacting the pre-processed electronic waste with a lixiviant such that at least a portion of the target metal(s) dissolve into the lixiviant to produce a pregnant solution;
  (c) a biosorption step comprising contacting a microorganism with the pregnant solution such that at least a portion of the target metal(s) ions biosorb to the microorganism wherein the microorganism becomes metal laden and the pregnant solution becomes a barren solution;
  (d) a separating step comprising substantially separating the metal laden microorganism from the barren solution; and
  (e) optionally, a recovery step comprising recovery of the target metal(s) from the metal laden microorganism.

Figure 2:
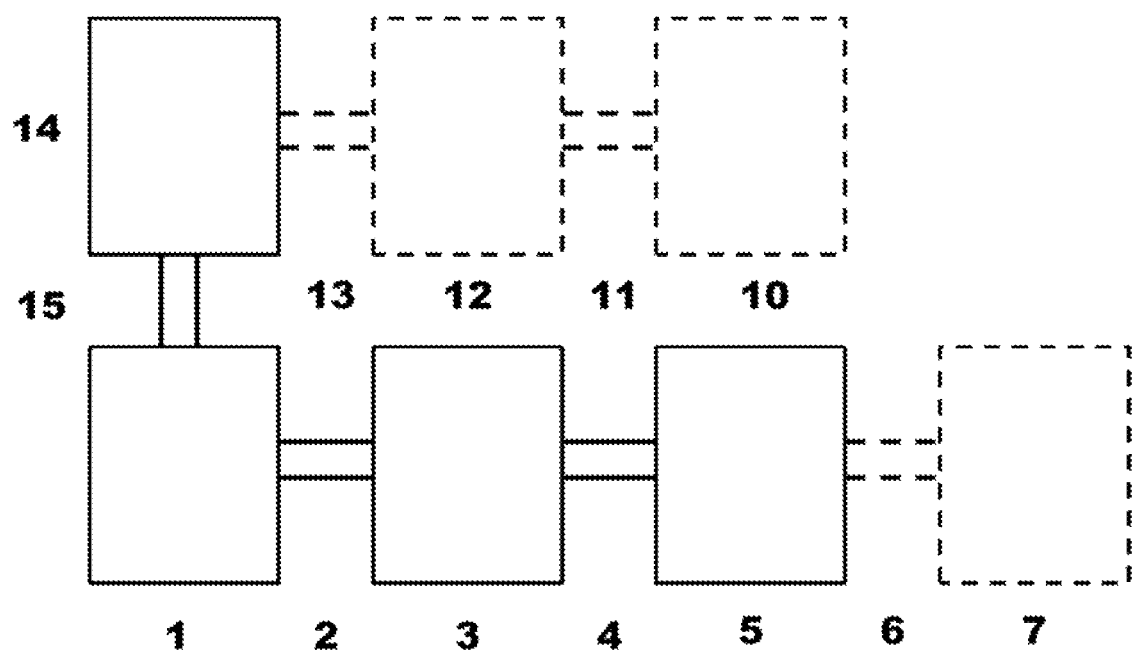
FIG. 2 represents a method of recovering one or more target metals from electronic waste in accordance with the first aspect of the invention or a system configured for the recovery of target metal from electronic waste in accordance with the third aspect of the invention comprising multiple pre-processing steps.

Referring to FIG. 1 and FIG. 2, there is provided a method for recovering one or more precious metals from electronic waste wherein the method includes a pre-processing step which may comprise one or more unit operations including but not limited to:
  chip removal
  grinding to a preselected maximum size
  removal of certain density fractions
  removal of magnetic material
  one or more base metal leach(es)

There are number of benefits of performing one of more of these pre-processing steps prior to precious metal recovery, including reducing the volume of the material to be processed in the target metal recovery step, removal of certain fractions that may interfere with precious metal recovery or reduce the efficiency of the target metal lixiviant, and enabling selective capture of certain valuable fractions.

It is well know that electronic waste contains a wide variety of non-target materials including elements and compounds. However some of those non-target materials may have a deleterious effect on the recovery of the target metal(s). The inventors have surprisingly found there is significant benefit to pre-processing the electronic waste prior to dissolving the target metal(s) in the lixiviant to remove certain non-target materials such as certain components, elements, metals and/or compounds.

In particular embodiments the pre-processing step removes at least 50% of the no-target metal(s)s prior to the precious metal recovery, or at least 60%, or at least 70%, or at least 80%, or at least 90%, or at least 95% of the non-target materials. In particular preferred embodiments the pre-processing step removes less than 20%, or less than 10%, or less than 5%, or less than 2%, or less than 1% of the target metal(s).

Referring to FIG. 1, in particular embodiments the method includes a pre-processing step 8, configured to remove or recover at least a portion of non-target material prior to passing to the target metal leach 1 (dissolving step) via conduit means 9. Those skilled in the art will recognise that the pre-processing step may include a number of unit operations targeting recovery or removal of various portions non-precious metal material.

For example, in accordance with one embodiment of the invention depicted in FIG. 2, there is provided a pre-processing step including several unit operations including chip removal (10), grinding to a specified particle size (12) followed by a base metal leach (14).

Chip Removal

In certain embodiments of the invention the method includes one or more steps configured to remove chips and other surface mounted components from printed circuit boards prior to precious metal recovery. Those skilled in the art will recognise that chips and other components are typically fixed to printed circuit boards with solder. Soldering on printed circuit boards typically comprises tin and lead, tin and silver or a combination thereof. As such, a chip removal process typically comprises the removal of solder through elevating the temperature of the solder above the melting point of the solder or by dissolving the solder in a suitable solvent. Chips and other components can then be simply removed by shaking, vibrating, scraping or knocking the PCB's such that the chips and other components fall off.

Those skilled in the art will appreciate suitable means for heating and removing chips and other components from printed circuit boards. However, by way of non-limiting example, the chips and other components may be heated in a trommel device configured for tumbling a plurality of printed circuit boards at elevated temperatures. For example Wang et al (*Waste Management*, Vol 53, July 2016, 218-224) provide an automated system for dissembling PCBs with heated air at 265° C. that can remove solder in 8 mins.

Additionally or alternatively, the chips and other surface mounted components may be removed or recovered by immersing the printed circuit boards in a solvent system suitable for selectively dissolving the solder. Those skilled in the art will recognise there are a number of solvent systems suitable for selectively dissolving solder. For example Yang Jian-Guang et al (*Journal of Hazardous Material, Vol* 304, *March* 2016, 409-416) provide a 1:1 mixture of SnCl4 and HCl which can remove up to 99% of tin at 60-90° C. Additionally or alternatively, Manis Kuma Jha et al (*Hydrometallurgy*, Vol 121-124, June 2012, 28-34) provide a nitric acid solution for dissolution of lead and tin solder comprising 0.2M $HNO_3$ with solid:liquid ratio of 1 g/100 ml at 90° C. recovers 99.99% of lead in 120 minutes.

During a chip removal process it may be beneficial to recover solder, solder components, chips and other surface mounted components once removed from the printed circuit boards. Those skilled in the art will appreciate there are a number of methods for recovering such materials, for example chips and other surface mounted components may be recovered in a tray and sorted through size exclusion screens.

Grinding

Due to the heterogeneous nature of electronic waste, particularly PCB's, it may be desirable to grind the PCB material to a particular average size prior to precious metal recovery. In addition, it is recognised that significant quantities of precious metals are embedded within chips or other components and can only be accessed if the PCB material is first ground to a particular size fraction. The inventors have also found grinding of the e-waste can be beneficial to later process steps, such as pumping or otherwise transferring the ground e-waste and/or the e-waste in the lixiviant to the next steps. Those skilled in the art will appreciate that grinding any material typically results in a distribution of sizes and the resulting distributed sizes may be separated through well known size exclusion or size separating technologies such as size exclusion screens to provide particles with a maximum size. Those skilled in the art will recognise PCB's can be ground to a particular average size though various well know crushers or grinders, such as hammer mills, ball mills, ring mills and shredders or a combination of two or more such implements. By way of example, the grinding step might include a cutting stage followed by a two-step grinding and crushing stage. In the first stage the particle size may be reduced to an average of 3 mm. This may be followed by sieving of particles to reduce the average size below 1 mm prior to a second stage of grinding, ideally down to the range of 0.1-0.9 mm. Large particles may be sieved and returned to earlier grinding stages for further comminution (Silvas et al. *Waste Management*, Vol 46, December 2015, 503-510).

By way of example, grinding to a particle size of less than 1 mm improves the rate of copper and other base metal extraction, however below 0.5 mm no significant improvements are observed. When grinding to particle sizes below 0.075 mm the copper and lead extraction rates are adversely affected (Chen et al. *Journal of Cleaner Production*, Vol 95, *May* 2015, 142-147). Since shredding, grinding and milling are energy intensive processes, there is a desire to maximise extraction efficiency while minimising energy consumption.

In particular embodiments of the invention, the pre-processing step includes grinding the printed circuit boards to a diameter of about less than 10 cm, or less than 8 cm, or less than 5 cm, or less than 3 cm, or less than 1 cm, or less than 5000 microns, or less than 2000 microns, or less than 1000 microns, or less than 500 microns, or less than 200 microns, or less than 100 microns, or less than 50 microns, or less than 20 microns. In a preferred embodiment, the pre-processing step includes grinding the PCB's to an average size of about 10 to 0.05 mm diameter. In particular embodiments pre-processing step comprising grinding to a preselected average size wherein the preselected size is an average of about 10 to 0.05 mm diameter. In particular embodiments the preselected size is an average of about 5 to 0.1 mm diameter. While it will be appreciated the particles may not be spherical, a person skilled in the art will understand the size of a non-spherical particle can be approximated to a sphere.

Density Fraction Removal

Once the printed circuit board material has been ground to a smaller particle size, the particles within the ground material may differ in weight and density. By way of non-limiting example, particles containing significant amounts of metal will have a higher density than particles that are substantially free of metals. As such it may be beneficial to separate particles that are substantially free of metals from particles comprising metals. Those skilled in the art will recognise there are a number of well know technologies for separating out ground materials based on density. However, by way of non-limiting example, such particles may be separated using floatation, shaker tables and/or electrostatic separation. In a particular embodiment of the invention, wherein the printed circuit boards are ground to <200 microns, the method includes removal of substantially metal free particles by electrostatic separation.

For example according to Kaya (*Waste Management*, Vol 57, November 2016, 64-90) there are three main types of electrostatic separation:

1—Corona electrostatic separation (most useful in producing a metallic and non-metallic mixture with little to no cross-contamination, works best with a 0.6-1.2 mm PCB size for industrial applications)
2—Eddy current separation (useful for recovering aluminium)
3—Triboelectric separation Removal of Magnetic Material Once the printed circuit board material has been ground to a smaller particle size, it may be beneficial to separate magnetic material from non-magnetic material. Precious metals and many base metals are non-magnetic so it may be beneficial to separate magnetic material prior to further treatment. Magnetic material may be removed using a magnetic field to physically remove magnetic material from ground printed circuit boards. For example, metal and non-metal components are completely dissociated from one another with a crush size below 0.6 mm (e.g. Guo Chao Wang Hui et al. *Waste Management* Vol 31, September-October 2011, 2161-2166). A two step crushing process may be used, with particles above 1.25 mm recycled into the feed loop, followed by electrostatic separation and magnetic separation.

Base Metal Leach

Since printed circuit boards typically comprise a plurality of different metals and alloys, it may be beneficial to separate out some metals prior to precious metal recovery. Those skilled in the art will recognise that most metals have solubility properties based on their electronic configuration, placement on the periodic table, size, hardness/softness as well as other factors. As such, it is possible to substantially dissolve certain metals while leaving others substantially undissolved based on their solubility properties. For example, base metals such as copper, zinc, aluminium, iron, and tin tend to be at least partially soluble in sulfuric acid while precious metals such as gold, platinum and silver are substantially less soluble. As such, selective dissolution may be used to separate some metals from the printed circuit board material.

By way of non-limiting example, certain base metals may be selectively dissolved and separated from precious metal bearing printed circuit board material using techniques including but not limited to:

Kell process (oxidative pyrolysis)
Sulphuric acid leach
Hydrochloric acid leach
Nitric acid leach
Ammonia leach The Kell process comprises a hydrometallurgical alternative to smelting of concentrates containing base metals and precious metals. The process involves three main steps (commonly on mining ores):

1—Aqueous pressure oxidation in an acidic sulphate medium to dissolve the base metals.
2—Roasting of the previous materials to improve leaching conditions in the final stage.
3—Leaching of precious metals in chloride media to dissolve the remaining metal contents.

The key feature of this process is the separation of the base metal and precious metal chemistries (http://www.saimm.co.za/Conferences/Pt2010/181-186_Liddell.pdf).

A sulphuric acid leach comprising 2M sulphuric acid and 35% hydrogen peroxide in a 4:1 ratio can be used in a two-step process to selectively dissolve the base metals, including copper, iron, nickel, tin, zinc and aluminium as the most common metals. A solid to liquid ratio of 1:10 was found to be most optimal (Behnamfard et al. *Waste Management,* 33 (2013) 2345-2363). Furthermore, Kaya (*Waste Management,* Vol 57 (2016) 64-90) incorporated herein by reference, provides a detailed table of base metal lixiviants.

It is also reported that 1-6M nitric acid can be used for the dissolution of base metal, particularly copper, lead and tin (plus other common base metals in shredded e-waste). When concentrations of nitric acid of over 4M are used, tin precipitates as metastannic oxide. Mecucci et al (*Journal of Chemical Technology and Biotechnology,* Vol 77 (2002) 449-457) claim that nitric acid has advantages over sulphuric acid as it forms less precipitates. Furthermore nitric acid itself is oxidising so requires less or no extra oxidant and has the potential to be regenerated and/or recycled ore easily.

Fazhul et al (http://dspace.unimap.edu.my/dspace/bitstream/123456789/7476/1/Selective%20leaching%20for%20the%20recovery%20of%20Copper.pdf) provide a lixiviant comprising ammonia that selectively leaches certain base metals (particularly copper) in the presence of other common base metals. Additionally or alternatively Sun et al. (Environmental Science and Technology Letters, 49 (2015) 7981-7988) provide a process comprising ammonium (7.55 wt %) with 196 g/L ammonia carbonate with air at room temperature and a solid to liquid ratio of 1 g/5 ml that can be used to leach to copper, while removing low amounts of other base metals, predominantly zinc (<5% total).

Dissolution Step

FIG. 1 shows an embodiment of the invention in which vessel 1 is configured for dissolving target metal from electronic waste. In particular embodiments the pre-processed electronic waste is added to vessel 1, wherein a suitable lixiviant is applied leading to at least partial dissolution of one or more target metal(s) to produce a pregnant solution containing target metal ions. Those skilled in the art will appreciate suitable lixiviants and conditions necessary to dissolve at least a portion of the target metal.

In particular embodiments the pregnant solution contains more than 1000 ppm, or more than 500 ppm, or more than 200 ppm, or more than 100 ppm, or more than 50 ppm, or more than 20 ppm, or more than 10 ppm, or more than 5 ppm, or more than 1 ppm. Preferably the pregnant solution contains between about 0.1 ppm to 1500 ppm, or between about 0.1 ppm to 1000 ppm, or between about 0.1 ppm to 500 ppm, or between about 0.1 ppm to 200 ppm, or between about 0.1 ppm to 100 ppm, or between about 0.1 ppm to 50 ppm, or between about 0.1 ppm to 20 ppm of the target metal. Preferably the pregnant solution contains between about 0.5 ppm to 1500 ppm, or between about 0.5 ppm to 1000 ppm, or between about 0.5 ppm to 500 ppm, or between about 0.5 ppm to 200 ppm, or between about 0.5 ppm to 100 ppm, or between about 0.5 ppm to 50 ppm, or between about 0.5 ppm to 20 ppm of the target metal. Preferably the pregnant solution contains between about 1 ppm to 1500 ppm, or between about 1 ppm to 1000 ppm, or between about 1 ppm to 500 ppm, or between about 1 ppm to 200 ppm, or between about 1 ppm to 100 ppm, or between about 1 ppm to 50 ppm, or between about 1 ppm to 20 ppm of the target metal.

In accordance with the methods of the invention, in certain embodiments lixiviant solutions used to dissolve target metal ions serve as a pregnant solution. By way of non-limiting example, when gold is the target metal, the pregnant solution may be produced by dissolving the target metal(s) in a lixiviant comprising a thiourea-based solution, or a thiosulphate-based solution, or a thiocyanate-based solution, or a cyanide-based solution, or a halogen-based solution, or an aqua regia-based solution, and examples of suitable conditions can be found in Aylmore, *Developments in Mineral Processing* 15, pp 501-539 (2005) and references therein.

Lixiviant systems suitable for dissolving one or more target metals act at different rates, pH's, temperatures, ORP's and those skilled in the art will appreciate how the conditions may be optimised to ensure the target metal(s) are dissolved efficiently. Examples of suitable lixiviant systems include:

Water and Chlorine

A lixiviant system of water as the solvent plus chlorine gas can be used to dissolve gold. This system is not selective but will dissolve most metals (A Straightforward Route to Tetrachloroauric Acid from Gold Metal and Molecular Chlorine for Nanoparticle Synthesis. doi:10.3390/met5031454).

Water Miscible Solvent, Oxidant and Chloride

According to WO 2016/168933, herein incorporated by reference, a lixiviant system comprising glacial acetic acid as the solvent, an oxidant and a chloride source can be used to dissolve gold selectively. For example, acetic acid, hydrochloric acid and chlorine gas was shown to selectively dissolve gold from printed circuit boards. Similarly a lixiviant system of glacial acetic acid as the solvent plus hydrochloric acid plus calcium hypochlorite can be used to dissolve gold selectively. Additionally, a lixiviant system of glacial acetic acid as the solvent plus hydrogen peroxide plus hydrochloric acid plus calcium chloride can be used to dissolve gold selectively.

Potassium Iodide and Iodine

A lixiviant system of water as the solvent plus iodine plus potassium iodide can be used to dissolve gold in accordance with U.S. Pat. No. 3,957,505.

Thiourea

A lixiviant system of thiourea plus ferric ions in a water solvent with a pH between 1-3 can be used to dissolve gold. (Alternative Lixiviants to Cyanide for Leaching Gold Ores, DOI: 10.1016/S0167-4528(05)15021-2).

Thiosulfate

A lixiviant system of thiosulfate plus ammonia plus copper (II) can be used to dissolve gold. (Alternative Lixiviants to Cyanide for Leaching Gold Ores, DOI: 10.1016/S0167-4528(05)15021-2).

Aqua Regia

A lixiviant system of nitric acid plus hydrochloric acid volume ratio of approximately 1:4 can be used to dissolve gold. (Cyanide and Other Lixiviant Leaching Systems for Gold with Some Practical Applications, DOI: 10.1080/08827509508914125).

Cyanide

A lixiviant system of sodium cyanide (0.02-0.1%) in a water solvent with a pH between 10-11 that is saturated with air can be used to dissolve gold. (Cyanide and Other Lixiviant Leaching Systems for Gold with Some Practical Applications, DOI: 10.1080/08827509508914125).

In particular embodiments the lixiviant system may be used to selectively dissolve target metal while leaving non-target metal substantially undissolved or dissolved to a smaller degree. Those skilled in the art will recognise that most target metals such as gold are typically less soluble in most lixiviant systems than non-target material(s) such as base metals. However, in particular embodiments, at least a portion of the precious target metal is dissolved in the lixiviant system while non target material(s) are dissolved at a slower rate. Additionally or alternatively, at least a portion of the target metal is dissolved in the lixiviant system while a smaller proportion of the non-target metal is dissolved compared to undissolved metal.

In particular embodiments, the target metal(s) and non-target metals are substantially selectively dissolved by the lixiviant in a ratio of greater than 1:1000 (target metal:non-target metal), or greater than 1:500, or greater than 1:200, or greater than 1:100, or greater than 1:50, or greater than 1:20, or greater than 1:10, or greater than 1:5, or greater than 1:2, or greater than 1:1.

According to WO2016/108933, systems that use acetic acid show greater selectivity towards gold than systems that use other solvents such as water. One such system is the glacial acetic acid, hydrochloric acid and calcium hypochlorite system. This lixiviant showed a molar ratio of 1 part gold to 1.32 parts copper and 0.87 parts nickel at 4 minutes where all the gold is dissolved, starting with an input of 1 part gold to 133.6 parts copper and 38 parts nickel. Another system is glacial acetic acid plus hydrochloric acid plus chlorine, this system showed a molar ratio of 1 part gold to 2.4 parts copper and 0.6 parts nickel at 1 minute where all the gold is dissolved starting with an input of 1 part gold to 138.7 parts copper and 46.6 parts nickel.

In particular embodiments, the electronic waste material/lixiviant mixture may need to be gently heated to over 30° C., or over 40° C. or over 50° C. to assist with dissolution of the target metals. Similarly, the mixture may be agitated, sonicated, vibrated or otherwise treated to assist with dissolution.

Biosorption Step

Following dissolution of at least a portion of the target metal(s) in the lixiviant, the pregnant solution is passed to the biosorption vessel 3 via conduit 2. The biosporption vessel 3 is configured to enable the contacting of the pregnant solution with a microorganism. Upon contact, at least a portion of the target metal(s) are biosorbed by the microorganism such that the microorganism become metal laden and the pregnant solution becomes barren. In accordance with embodiments of the invention, the microorganism is contacted with the pregnant solution for at least 2 minutes, or at least 5 minutes, or at least 10 minutes, or at least 30 minutes, or at least 60 minutes, or at least 120 minutes, or for a period of time necessary to biosorb at least 50% of the target metal(s), or at least 60% of the target metal(s), or at least 70% of the target metal(s), or at least 80% of the target metal(s), or at least 90% of the target metal(s), or at least 95% of the target metal(s). The time period is preferably, between about 0.5 and 48 hours, or between about 0.5 and 24 hours, or between about 0.5 and 12 hours, or between about 0.5 and 4 hours, or between about 1 and 3 hours.

In a particular preferred embodiment of the invention, the microorganism preferentially biosorbs the target metal over a further metal or metals in the pregnant solution (non-target metal(s)). The further metal(s) is then separated from the target metal in the separation step where the further metal remains in the barren solution. Examples 8 and 9 show the preferential nature of the biosorption step. The factor of preferential biosorption will in part depend on the ratio of the metals in the pregnant solution, for example if they are already in similar quantities the mass ratio may not change as much as if there is a large excess of the further metal. However, preferably the microorganism preferentially biosorbs the target metal over the further metal in the biosorption step such that the mass ratio of target metal to further metal in the pregnant solution compared to the ratio of the target metal of the further metal biosorbed to the microorganism increases by a factor of at least 2, or at least 3, or at least 5, or at least 8, or at least 10, or at least 20, or at least 50, or at least 100, or at least 200. The upper limit of the increase in ratio will in part be dependent on the starting ratio, but may be 1,000 or higher. Preferably the target metal is gold. Preferably the further metal is selected from one or more of copper and nickel.

The conditions necessary to biosorb the target metal(s) will depend on a number of factors including pH, ORP, concentration of the microorganism. However, in accordance with a particular embodiment of the invention, the microorganism is added to the pregnant solution in a concentrate at acidic pH. In one embodiment, the microorganism is washed in a buffer solution, for example phosphate, Tris, saline, acetate and/or perchlorate, prior to contact with a pregnant solution. Similarly, the microorganism may be concentrated in volume prior to contact with a pregnant solution. Such a concentration may be to at least 50%, or at least 10%, or at least 1%, or at least 0.1% of the original volume.

A number of microorganisms are capable of biosorbing metal ions. The microorganism is preferably an algae or bacteria, preferably a Gram-negative or Gram-positive bacteria, for example from of the genus *Pseudomonas, Escherichia, Bacillus, Desulfovibrio, Plectonema, Cupriavidus, Clostridium* or *Delftia*. The microorganism is preferably selected from an environment where the target metal is found in a physiologically relevant amount, for example lower than 0.5 ppm. Examples of microorganisms that are capable of biosorbing metal ions include the Gram-negative bacteria *Pseudomonas aeruginosa* and *Escherichia coli*, the Gram-positive bacterium *Bacillus subtilis*, and the fungi *Saccharomyces cerevisiae*. Nancharaiah et al (*Trends in Biotechnology* 34, pp 137-155 (2016)), incorporated herein by reference, identifies the wide range of microorganisms that may be employed to biosorb target metals in accordance with the methods of the invention. The majority of biosorption processes are adsorptive in nature (i.e. metal ions are bound to the surface of a microorganism through passive interaction with cell wall or membrane moieties), but some are absorptive (i.e. metal ions are actively internalised by a microorganism).

In particular embodiments wherein the target metal(s) ion is gold, microorganisms such as the Gram-negative bacteria *Pseudomonas aeruginosa, P. putida* and *Desulfovibrio desulfuricans*, Gram-positive bacteria *Bacillus subtilis*, and/or the algae *Plectonema boryanum* have been shown to biosorb gold (Reith et al, *International Society for Microbial Ecology Journal* 1, pp 567-584 (2007)). In certain preferred embodiments the microorganism is selected from environments in which gold is found in physiologically relevant concentrations, such as the Gram-negative bacteria *Cupriavidus metallidurans* and *Delftia acidovorans* (Rea et al, *FEMS Microbiology Ecology* 92, pp fiw082 (2016)). In other preferred embodiments, the microorganism is selected from those used in other industrial processes, such as the Gram-positive bacterium *Clostridium autoethanogenum* (Abrini et al, *Arch Microbiol* 161, pp 345-351 (1994)).

When used in the invention, rather than in the environment, the microorganism is generally a monoculture, or at least a limited mixture of two to five microorganisms. Further, in the natural environment, the microorganism is generally only exposed to low levels of the target metal, for example, less than 0.5 ppm. In preferred embodiments of the invention, the pregnant solution contains relatively high amounts of target metal, for example greater than 0.5 ppm or greater than 1 ppm. It is therefore surprising the microorganism still has the capacity to biosorb higher levels of target metal. Additionally or alternatively, it is surprising that the microorganism is able to biosorb the target metal in relatively short time periods, for example less than 12 hours, even where the target metal is at low or higher concentrations.

The inventors have found *Cupriavidus metallidurans* (*C. metallidurans*) to be particularly useful in the present invention where gold is the target metal. The inventors have found *C. metallidurans* to be relatively easy to grow, good at biosorbing gold and/or biosorbs the target metal relatively quickly and/or is good for preferentially biosorbing gold (see Example 8 and 9) and/or is relatively tolerant to other metals being present in the pregnant solution.

In particular embodiments wherein the target metal ion is gold, and the pregnant solution is a thiosulphate-based solution, or a cyanide-based solution, or a chloride-based solution, *C. metallidurans* may be used to biosorb the gold-thiosulphate complex, or aurocyanide, or chloroaurate respectively (Reith et al, *PNAS* 106, pp 17757-17762 (2009); Etschmann et al, *Chemical Geology* 438, pp 103-111 (2016)).

Upon at least partial biosorption of the target metal ion, the solution becomes a barren solution, wherein the barren solution contains less of the target metal than the pregnant solution. In particular embodiments, the barren solution contains less than 0.1 ppm or less than 1 ppm, or less than 2 ppm, or less than 5 ppm, or less than 10 ppm, or less than 20 ppm, or less than 50 ppm, or less than 100 ppm of the target metal. Preferably the barren solution contains between about 0.001 and 100 ppm, or between about 0.001 and 50 ppm, or between about 0.001 and 50 ppm, or between about 0.01 and 50 ppm of the target metal(s). In particular embodiments, the pregnant solution contains at least 10 times more target metal(s) than the barren solution. Preferably the pregnant solution contains at least 20 times, or at least 40 times, or at least 45 times, or at least 50 times more target metal(s) than the barren solution.

It is acknowledged that the microorganism may be cultivated in a separate vessel or vessels by any methods familiar to those skilled in the art prior to contacting with the pregnant solution in biosorption vessel 3. By way of example, a microorganism can be cultivated in a bioreactor (eg vessel 20 in FIG. 4) containing suitable growth media and transferred to biosorption vessel 3. The microorganism may be concentrated prior to transfer or passed directly without further concentration. In certain embodiments, the microorganism is concentrated through gravity separation and passed to biosorption vessel 3 as a concentrated microorganism slurry in a minimal volume of growth media. In a related embodiment, the concentrated microorganism slurry may be washed in another solution prior to being passed to biosorption vessel 3.

In certain embodiments, the microorganism is cultivated in rich liquid media (e.g. nutrient broth or tryptic soy broth) until the mid-log or stationary phase of growth is reached.

Separation Step

Referring to FIG. 1, upon at least partial biosorption of the target metal(s), the metal laden microorganism is separated from the barren solution in separation module 5. It is anticipated that the initial part of the separation step may occur in the same vessel as the biosorption step, wherein the metal laden microorganism is simply allowed to concentrate via gravity separation. In other embodiments, the metal laden microorganism and barren solution are passed to a separation module 5 via conduit means 4 for separation. Examples of means to separate a microorganism from a barren solution will be familiar to those skilled in the art. However, by way of example, the metal laden microorganism may be separated by gravity separation, centrifugation, filtration or a combination thereof such that in each case the barren solution is removed from the metal laden microorganism.

Reference to substantially separating should be taken to mean physically separating at least a portion of the barren solution from the metal laden microorganism. Physically separating refers to having them in separate non-touching locations, for example separate containers rather than touching layers within the same container.

In particular embodiments, the metal laden microorganism gravity separate from the barren solution over a time period in biosorption vessel 3 or separation module 5. Following gravity separation, at least a portion of the barren solution can be decanted, syphoned or otherwise removed leaving the concentrated metal laden microorganism which can be passed to optional recovery module 7 to carry out the recovery step via conduit means 6.

In certain embodiments, the separating step comprises gravity separation of the metal laden microorganism from the barren solution, wherein at least 50% of the barren solution is removed. Preferably at least 60%, or at least 70%, or at least of 80%, or at least 90%, or at least 95% of the barren solution is removed. By way of example, a solution of the microorganism may be left to sediment by gravity for up to 2 hours, or up to 6 hours, or up to 12 hours, or up to 24 hours, or up to 48 hours, or up to 72 hours before removing the barren solution.

In an alternative embodiment, the metal laden microorganism can be separated from the barren solution in separation module 5 by centrifugation and removal the barren solution. Those familiar with the art will recognise the appropriate conditions and equipment necessary for separating the barren solution from the metal laden microorganism, which following separation can be passed to recovery module 7 via conduit means 6.

In certain embodiments, the separating step comprises separating the metal laden microorganism by centrifugation, wherein during the centrifugation at least 50% of the barren aqueous solution is removed from the metal laden microorganism. Preferably at least 60%, or at least 70%, or at least of 80%, or at least 90%, or at least 95% of the barren solution is removed during centrifugation.

Those skilled in the art will recognise operation of a centrifuge will be dependent on the volumes of liquid addressed and the rate of separation required. There are also a number of centrifuge systems that may be employed with the methods and systems of the invention including suitable continuous flow centrifugation or decanter centrifuge device. In a further embodiment, the metal laden microorganism can be separated from the barren solution in the separation module 5 by filtration. Those familiar with the art will recognise the appropriate conditions and equipment necessary for separating the barren solution from the metal laden microorganism, which following separation can be passed to recovery module 7 via conduit means 6.

In certain embodiments, the separating step comprises separating the metal laden microorganism by filtration, wherein during the filtration at least 50% of the barren solution is removed from the metal laden microorganism. Preferably at least 60%, or at least 70%, or at least of 80%, or at least 90%, or at least 95% of the barren solution is removed during filtration. As an example, solutions containing the metal laden microorganism may be filtered under vacuum through filters with pore size of approximately 0.45 µm or approximately 0.65 µm or approximately 0.8 µm or approximately 1 µm to remove barren solution. As another example, a cross flow filtration device or membrane bioreactor device may be used to remove the barren solution.

The separating step is important for a number of reasons. The separating step removes the metal laden microorganism, and therefore the target metal, from the other components in the pregnant solution. The other components in the pregnant can be toxic or corrosive, such as cyanide or acids. The separation step also allows for the concentration of the target metal. Following the separation step the dried metal laden microorganism preferably include greater than 100 ppm, or greater than 200 ppm, or greater than 500 ppm or greater than 1000 ppm or greater than 30.00 ppm of the target metal. Further the inventors have shown significant concentration factors of the target metal from the pregnant solution to the separated microorganism. The concentration factor of the target metal from the pregnant solution to the microorganism (i.e. the number of times more concentrated target metal is in the microorganism over the pregnant solution) is greater than 5 or greater than 10, or greater than 20, or greater than 50, or greater than 100, or greater than 900. For example, Example 1 shows a concentration factor of the target metal from the pregnant solution to the microorganism of 990. Wet microorganism biomass is commonly estimated to be five-fold that of its dry mass, i.e. dry mass is ~20% of wet mass (Luria, The Bacteria, vol. 1. Academic Press, Inc., New York, pp 1-34 (1960)). It therefore follows that metal concentration factors calculated for wet microorganism biomass, as used in Examples 1 and 6, can be multiplied five-fold to estimate concentration factors for the dry microorganism. Drying of the microorganism is exemplified in Example 11A. This concentration is important as, for example, although lixiviants are used in hydrometallurgy to extract metal the metal must still be recovered from the lixiviant.

The separation step can in some cases also allow for selective separation and/or concentration of metals, for example, Example 8 demonstrates preferential biosorption and then separation and/or concentration of gold from copper. The gold selectively biosorbs to the microorganism, so that in the separating step the gold which is biosorbed to the microorganism is separated from the copper in the barren solution.

Recovery Step

Those familiar with the art will recognise suitable recovery means for recovering target metal(s) from the metal laden microorganism in recovery module 7. However, by way of non-limiting example, the metal may be desorbed from the metal laden microorganism by altering the conditions of the microorganism. For example in certain embodiments of the invention, the metal may be desorbed from the metal laden microorganism by altering the pH of the microorganism, for example by contacting the microorganism with a solution that contains an acid or a base. In such an embodiment, the microorganism would be contacted with a liquid with a particular pH to elicit desorption of the target metal(s) into the liquid. In particular embodiments, the pH of the contacted liquid is higher pH than the barren solution while in other embodiments the pH is lower—depending on the characteristics of the system. By way of example, the conditions may be of pH less than 5, or pH less than 4, or pH less than 3, or pH less than 2. By way of further example, the conditions may be of pH greater than 8, or pH greater than 9, or pH greater than 10, or pH greater than 11, or pH greater than 12.

In an alternative embodiment, the metal laden microorganism may be contacted with a liquid containing a compound to elicit desorption of the target metal(s) into the liquid. By way of example, aqueous cysteine may be used in certain embodiments to elicit the desorption of the target metal(s). In certain embodiments wherein the target metal(s) is gold, approximately 0.3 mM, or approximately 1 mM, or approximately 10 mM, or approximately 30 mM, or approximately 60 mM cysteine solutions may be contacted with the metal laden microorganism (Kenney et al, *Geochimica et Cosmochimica Acta* 82, pp 51-60 (2012)). In a related embodiment, aqueous thiosulphate, thiourea, thiocyanate, cyanide or other thiol ligands may be used to elicit desorption of gold from the microorganism. Additionally or alternatively, other conditions such as a change in oxidation-reduction potential or temperature may be used to promote desorption of the target metal(s).

The concentrated solutions may then be subjected to separation and purification procedures such as precipitation of impurities, solvent extraction, adsorption and ion-exchange to isolate and/or further concentrate the target metal(s). Subsequently, the solutions can be treated by electrorefining process, chemical reduction, or crystallization for target metal(s) recovery or other methods that those skilled in the art will be aware of. In an alternative embodiment, the separated metal laden microorganism may be dried and burnt and/or smelted to recover the target metal(s), which may be separated from the ash using conventional pyrometallurgy or hydrometallurgy techniques known to those skilled in the art (Hennebel et al, *New Biotechnology* 32, pp 121-127 (2015)).

It will be apparent that the recovery step can recover the target metal in metallic or ion form. Reference to recovering the target metal should therefore be taken to include recovery of metallic metal or metal ions.

In particular embodiments of the methods and systems of the invention, the target metal is gold. In such embodiments, the separated gold laden microorganism may be dried at ambient temperature or 30° C. or 50° C. to minimise water content and then incinerated, for example by gas torch gently so as to minimise the loss of ash generated. This ash may then be treated with nitric acid to solubilise base metals, filtered, and the gold-containing residue treated with aqua regia (1 part nitric acid to 3 parts hydrochloric acid) to generate a solution of chloroauric acid. In a related embodiment, the gold laden microorganism may directly undergo the aforementioned acid treatment without requiring prior incineration. Gold may be precipitated and smelted from chloroauric acid using methods known to those with ordinary knowledge of the art.

In particular embodiments of the methods and systems of the invention, the target metal is gold. In such embodiments, the separated gold laden microorganism may be dried at ambient temperature or 30° C. or 50° C. to minimise water content and then incinerated by gas torch gently so as to minimise the loss of ash generated or by furnace at 1100° C., both techniques utilize borax flux to help bind the gold and minimise any loss, the flux also cleans away any oxide impurities from the gold. This ash may then be treated with nitric acid to solubilise base metals, filtered, and the gold-containing residue treated with aqua regia (1 part nitric acid to 3 parts hydrochloric acid) to generate a solution of chloroauric acid. In a related embodiment, the gold laden microorganism may directly undergo the aforementioned acid treatment without requiring prior incineration. Gold may be precipitated and smelted from chloroauric acid using methods known to those with ordinary knowledge of the art.

Recycling Solutions

Figure 3:
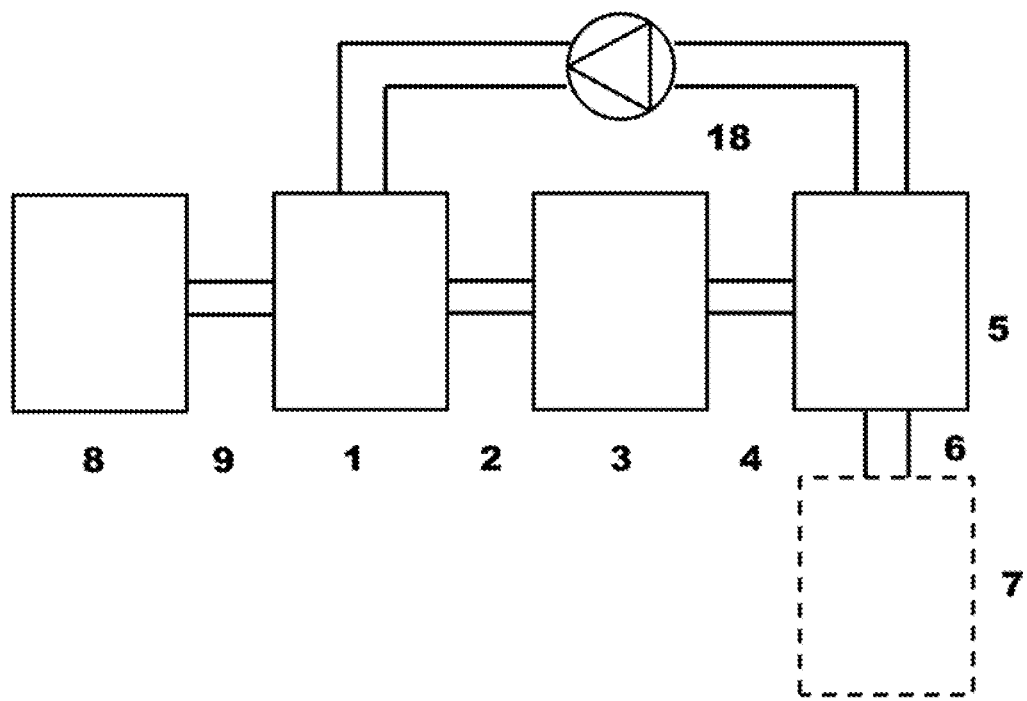
FIG. 3 represents a method of recovering one or more target metals from electronic waste in accordance with the first aspect of the invention or a system configured for the recovery of target metal from electronic waste recovering target metal from a pregnant solution in accordance with the fourth third aspect of the invention comprising a recycling step.

The inventors recognise the efficiency of the process may be improved by recycling certain solutions used within the process. For example, in certain embodiments there is provided means for recycling at least a portion of the barren solution separated from the metal laden microorganism back into dissolution vessel 1. It is anticipated that in certain embodiments, this recycle step reduces the amount of water needed by the overall system thus making it increasingly cost and/or environmentally efficient. Referring to FIG. 3, in certain embodiments, there is provided means 18 for passing at least a portion of the barren solution from separation vessel 5 to dissolution vessel 1. In particular embodiments, the system includes a pump to pass the solution from vessel 5 to vessel 1. It is appreciated that the barren solution may contain metal ions and in some instances may even include target metal ions. However, those skilled in the art will understand the quantity of barren solution that may be passed back to vessel 1 in order to dissolve the target metal(s). In some embodiments the barren solution may be treated to remove excess metal ions or other compounds prior to passing to dissolution vessel 1. In some embodiments, at least a portion of the barren solution is mixed with makeup water or other suitable liquid prior to passing to the dissolution vessel 1. Additionally or alternatively, at least a portion of the barren solution may be mixed with makeup liquid in dissolution vessel 1.

It is further recognised that additional components may need to be added to the barren solution such that it can act as a lixiviant in the dissolution vessel 1. For example, in certain embodiments where the lixiviant is thiosulfate or cyanide or thiourea or chlorine, the active lixiviant agent(s) may need to be at least partially recharged to enable further dissolution of the target metal(s). In certain embodiments, these additional components are added to the barren solution prior to passing to the dissolution vessel 1. In alternative embodiments, the additional components are added to the barren solution in the dissolution vessel 1. Additionally or alternatively, the barren solution may need to be treated to adjust the pH, the ORP, the temperature or any other physical properties that might be known to those skilled in the art in order to make it a suitable lixiviant.

Figure 4:
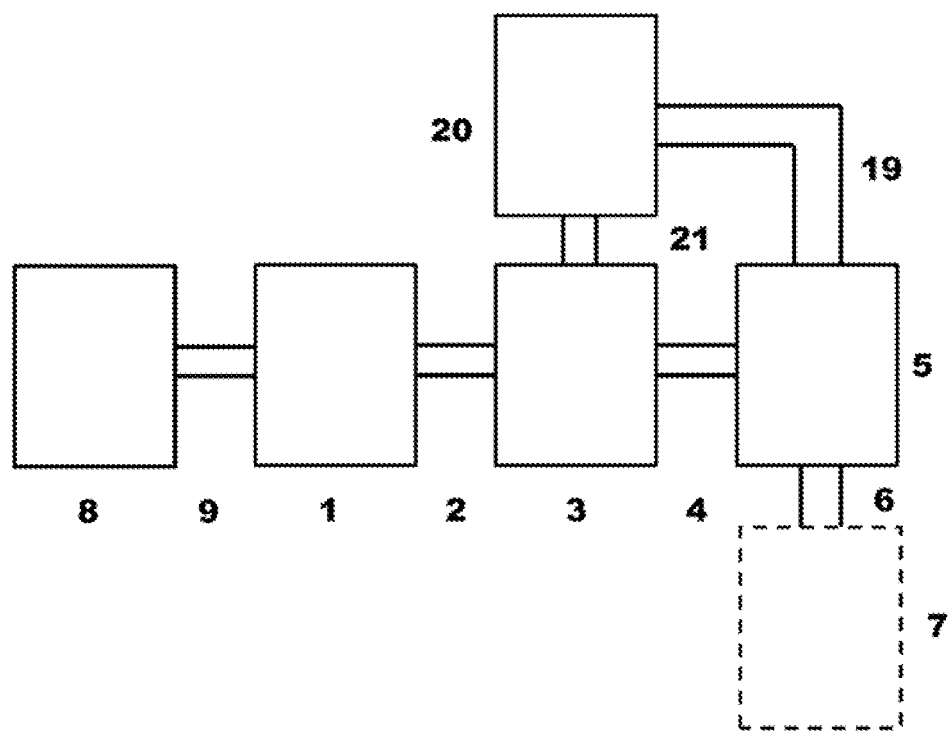
FIG. 4 represents a method of recovering one or more target metals from electronic waste in accordance with the first aspect of the invention or a system configured for the recovery of target metal from electronic waste recovering target metal from a pregnant solution in accordance with the fourth third aspect of the invention wherein microorganism may be cultivated in a separate vessel.

Referring to FIG. 4, in certain embodiments, there is provided means 19 for passing at least a portion of the barren solution from separation vessel 5 to bioreactor 20. In particular embodiments, the system includes a pump to pass the solution from vessel 5 to bioreactor 20.

It is appreciated that the barren solution may contain metal ions and in some instances may even include target metal(s) ions. However, those skilled in the art will understand the quantity of barren solution that may be passed back to bioreactor 20 in order to enable cultivation of the microorganism. In some embodiments the barren solution may be treated to remove excess metal ions or other compounds prior to passing to bioreactor 20.

In some embodiments, at least a portion of the barren solution is mixed with makeup water prior to passing to the bioreactor 20. Additionally or alternatively, at least a portion of the barren solution may be mixed with makeup water in bioreactor.

It is further recognised that additional components may need to be added to the barren solution such that it can act as a suitable cultivation media in the bioreactor 20. In certain embodiments, these additional components are added to the barren solution prior to passing to the bioreactor 20. In alternative embodiments, the additional components are added to the barren solution in the bioreactor 20. Additionally or alternatively, the barren solution may need to be treated to adjust the pH, the ORP, the temperature or any other physical properties that might be known to those skilled in the art in order to make it a suitable lixiviant.

In certain embodiments, at least a portion of the barren solution is passed to the bioreactor 20 and at least a portion is passed to the dissolution vessel 1 in accordance with any of the above embodiments described in relation to FIG. 3.

In particular embodiments at least 25% of the barren solution is passed to the dissolution vessel 1. In other embodiments, at least 35%, or at least 45%, or at least 55%, or at least 65%, or at least 75%, or at least 85%, or at least 95% of the barren solutions is passed to the dissolution vessel 1.

Alternatively, at least 25% of the barren solution is passed to the bioreactor 20. In other embodiments, at least 35%, or at least 45%, or at least 55%, or at least 65%, or at least 75%, or at least 85%, or at least 95% of the barren solutions is passed to the bioreactor 20.

Unless indicated otherwise, the order of steps described in the methods described herein is very much preferred and has been optimised by trials carried out by the inventors to ensure that the process provides an efficient yield and an economically viable recovery method.

EXAMPLES

Background Example 1 Biosorption of Gold Dissolved in Aqua Regia

Materials and Methods:

Microorganism cultures were grown under aseptic conditions, but subsequent processing took place using non-sterile solutions and equipment.

1. 25 mL of nutrient broth (0.5% peptone, 0.3% yeast extract) was inoculated with *Cupriavidus metallidurans* strain CH34 (Deutsche Sammlung von Mikroorganismen und Zellkulturen GmbH #2839) and grown for at least 16 hours to stationary phase at 30° C., ~200 rpm.
2. The culture was centrifuged at 3,100 rcf for 15 minutes, the supernatant discarded, and the pellet (~0.1 g) resuspended in 30 mL of 0.1 M sodium perchlorate to wash. This centrifuge/wash step was repeated again with a 10 mL volume.
3. The culture was centrifuged again as above, the supernatant discarded, and the pellet resuspended in 25 mL of 0.1 M sodium perchlorate, 25 μM chloroauric acid (~5 ppm Au), pH 4 (adjusted with sodium hydroxide). The pH of the gold/microorganism mixture was checked and adjusted to 4.0-4.5 using sodium hydroxide or hydrochloric acid as necessary.
4. The gold/microorganism mixture was incubated at room temperature for 2 hours. To keep the microorganism in suspension, the mixture was gently agitated on an orbital shaker throughout.
5. The mixture was centrifuged as per step 2, the supernatant (barren solution) discarded, and the pellet stored at 4° C.
6. The pellet (biosorption pellet) from step 5 (approximately 100 μL volume) was resuspended in 100 mL water, 1 mL of 70% nitric acid added, and then analysed for total gold content by inductively coupled plasma mass spectrometry (service provided by Watercare Services Ltd, Auckland, New Zealand).

Results:

At the end of the biosorption period (step 4), the pH of the mixture was checked, and was found to be between 4.5-5.0.

Total gold content was reported as mg/L based on the volume submitted for analysis, and used to calculate the amount biosorbed and biosorption yield (Table 1). Precision of total gold content was estimated at 15-20% variance.

TABLE 1

| Sample | Au input (mg) | Au content reported from step 6 (mg/L [ppm]) | Au biosorbed (mg) | Yield (% Au input) |
|---|---|---|---|---|
| C. metallidurans biosorption pellet | 0.125 | 0.990 | 0.099 (0.990 mg/L × 0.1 L) | 79 |

Based on the amount of gold biosorbed, the pregnant solution contained about 4 times more target metal (gold) than the barren solution.

Using the data in Table 1, the concentration of gold left in the barren supernatant was back calculated to be ~1 ppm ([0.125 mg−0.099 mg]/0.025 L). The concentration factor from the biosorption process was also calculated using the original biosorption pellet volume of ~100 μL (Table 2), i.e. the increase in concentration of Au from the pregnant solution to the biosorption pellet (wet microorganism). Wet microorganism biomass is commonly estimated to be five-fold that of its dry mass, i.e. dry mass is ~20% of wet mass (Luria, The Bacteria, vol. 1. Academic Press, Inc., New York, pp 1-34 (1960)). Therefore this approximates to a concentration factor for Au of about 990 from the pregnant solution to dry microorganism. This example shows a microorganism can be used to biosorb gold from an "ideal" solution, i.e. target metal gold in solution without other non-target metals or other non-target materials (such as glass fibre).

TABLE 2

| Sample | Au input solution concentration (mg/L [ppm]) | Au output pellet slurry concentration (mg/L [ppm]) | Increase in Au concentration to wet biomass (Concentration Factor) |
|---|---|---|---|
| C. metallidurans biosorption pellet | 5 | 990 (0.099 mg ÷ 0.0001 L initial volume of pellet) | 198 |

Background Example 2 Biosorption and Desorption of Gold Chloride

Materials and Methods:

Microorganism cultures were grown under aseptic conditions, but subsequent processing took place using non-sterile solutions and equipment.
1. 600 mL of tryptic soy broth (1.7% tryptone, 0.3% soytone, 0.25% glucose, 0.5% sodium chloride, 0.25% dipotassium phosphate) was inoculated with either *Bacillus subtilis* strain (Ehrenberg 1835) Cohn 1872 (Landcare Research New Zealand Ltd #20567) or *Pseudomonas putida* strain (Trevisan 1889) Migula (Landcare Research New Zealand Ltd #15057) and grown for at least 16 hours to stationary phase at 30° C., ~200 rpm.
2. Each culture was centrifuged at 2,500 rcf for 10 minutes, the supernatant discarded, and the pellet resuspended in 300 mL of water. This centrifuge/wash step was repeated a second time.
3. Each culture was centrifuged again as above, the supernatant discarded, and the pellet resuspended in 20 mL of 0.1 M sodium perchlorate. This centrifuge/wash step was repeated a second time.
4. Each culture was centrifuged again as above, the supernatant discarded, and the wet mass of the pellet weighed. Each pellet was resuspended in 0.1 M sodium perchlorate to give a 250 g/L concentration.
5. To 117.5 mL of 25 μM chloroauric acid (~5 ppm Au) pH 4 (adjusted with sodium hydroxide) (pregnant solution), 2.4 mL of 250 g/L microorganism solution was added to give a final concentration of ~5 g/L microorganism in 120 mL. This was performed separately for both *B subtilis* and *P. putida*. The pH of the gold/microorganism mixture was checked and adjusted to 3.0-4.0 using sodium hydroxide or hydrochloric acid as necessary.
6. Each gold/microorganism mixture was incubated at 30° C. for 2 hours. To keep the microorganism in suspension, each mixture was gently agitated on an orbital shaker throughout.
7. Each mixture was centrifuged as per step 2, and the supernatant (barren solution) decanted and stored at 4° C.
8. Each pellet was resuspended in 7 mL of supernatant, 0.11 g of L-cysteine hydrochloride monohydrate was added, and the pH adjusted with 1 M NaOH to 7.9-8.1. Each mixture was topped up with supernatant to a final volume of 10 mL, giving a cysteine concentration of ~62 mM.
9. Each cysteine/gold/microorganism mixture was incubated at 30° C. for 2 hours as per step 6.
10. Each mixture was centrifuged as per step 2, and the supernatant decanted. Both the supernatant and pellet were stored at 4° C.
11. The following *B. subtilis* and *P. putida* samples were analysed for total gold content by inductively coupled plasma mass spectrometry (service provided by Watercare Services Ltd, Auckland, New Zealand):
    a. Barren supernatant (step 7): 100 mL with 1 mL of 70% nitric acid added.
    b. Desorption supernatant (step 10): 7 mL made up to 100 mL with water (~14.3× dilution), 1 mL of 70% nitric acid added.

Results:

The wet mass of washed pellet from 600 mL of *B. subtilis* culture was 3 g, and was therefore resuspended in 12 mL 0.1 M sodium perchlorate to give a 250 g/L concentration; for *P. putida*, the mass and resuspension was 2.6 g and 10.4 mL respectively.

At the end of the biosorption period (step 6), the pH of each mixture was checked, and was found to be between 3.0-4.0.

Total gold content was reported as mg/L based on the volume submitted for analysis, and used to calculate the amount biosorbed or desorbed, and the yield when compared to the gold input mass (Table 3). Precision of total gold content was estimated at 15-20% variance.

TABLE 3

| Sample | Au input (mg) | Au content reported from step 11 (mg/L [ppm]) | Au content (mg) | Yield (% Au input) |
| --- | --- | --- | --- | --- |
| *B. subtilis* barren supernatant | 0.588 | 0.098 | 0.012 (0.098 mg/L × 0.12 L) | 2 (98% biosorbed) |
| *B. subtilis* desorption supernatant | 0.588 | 0.360 | 0.052 (0.36 mg/L × 14.3 dilution × 0.01 L) | 9 (91% still biosorbed) |
| *P. putida* barren supernatant | 0.588 | 0.300 | 0.036 (0.300 mg/L × 0.12 L) | 6 (94% biosorbed) |
| *P. putida* desorption supernatant | 0.588 | 4.400 | 0.629 (4.400 mg/L × 14.3 dilution × 0.01 L) | 107 (0% still biosorbed) |

For *B. subtilis* the pregnant solution contained about 49 times more target metal than the barren solution. For *P. putida* the pregnant solution contained about 16 times more target metal than the barren solution.

The results in Table 3 show both *B. subtilis* and *P. putida* biosorbed greater than 90% of the gold from the pregnant solution. Following the recovery step (steps 8-10) it was found *P. putida* readily desorbed the gold using cysteine conditions. *B. subtilis* less readily released the gold using cysteine conditions, although it is believed other conditions could be used to increase the recovery rate if required.

Using these results, the concentration factor from the biosorption process was calculated using the desorption supernatant volume of 10 mL (Table 4). In this Example the concentration factor is the change in concentration from the pregnant solution to the recovered Au (i.e. the desorption supernatant). The lower value for *B. subtilis* is due to the lower desorption rate discussed above, rather than the biosorption step.

TABLE 4

| Sample | Au input concentration (mg/L [ppm]) | Au output concentration (mg/L [ppm]) | Increase in Au concentration (Concentration factor) |
| --- | --- | --- | --- |
| *B. subtilis* | 5 | 5.2 (0.052 mg ÷ 0.01 L) | 1.0 |
| *P. putida* | 5 | 62.9 (0.629 mg ÷ 0.01 L) | 12.6 |

Background Example 3: Gold Dissolving Lixiviants

Materials and Methods:

A sample of gold-bearing quartz ore (milled to <100 μm particle size), containing ~16 ppm Au and ~260 ppm Ag, was obtained from a mine working from the Coromandel region, New Zealand. Printed circuit boards were collected from discarded desktop computers, and sections with gold-plated connector pins were cut from the boards and used as a model e-waste feedstock.

1. Lixiviant solutions for gold were made as per the following:
   a. Thiosulphate-based lixiviant: 0.2 M sodium thiosulphate pentahydrate, 0.4 M ammonia, 12 mM copper sulphate pentahydrate; pH adjusted to 9.5-10.0 using 1 M sulphuric acid.
   b. Thiourea-based lixiviant: 0.13 M thiourea, 5 mM iron (III) chloride; pH adjusted to 1.0-1.5 using 1 M sulphuric acid.
2. In separate 500 mL flat-bottomed glass bottles for each feedstock/lixiviant combination, 100 mL of lixiviant was added to each of the following gold feedstocks:
   a. 2 to 20 mg gold powder
   b. 25 g milled ore (containing ~0.4 mg Au)
   c. Two ~0.5 $cm^2$ gold-plated pin sections of e-waste
3. Reactions were incubated at 30° C., ~100 rpm for 20 hours. The lids of the bottles were kept loose to allow air exchange.
4. Reactions were allowed to stand (to let milled ore solids sediment), and pregnant lixiviant decanted. The following samples were analysed for total gold content by inductively coupled plasma mass spectrometry (service provided by Watercare Services Ltd, Auckland, New Zealand):
   a. Gold powder (thiosulphate-based lixiviant): 20 mL made up to 100 mL with water (2× dilution), 1 mL of 70% nitric acid added.
   b. Gold powder (thiourea-based lixiviant): 10 mL made up to 100 mL with water (2× dilution), 1 mL of 70% nitric acid added.
   c. Milled ore (thiosulphate-based lixiviant): 50 mL made up to 100 mL with water (2× dilution), 1 mL of 70% nitric acid added.
   d. Milled ore (thiourea-based lixiviant): 50 mL made up to 100 mL with water (2× dilution), 1 mL of 70% nitric acid added.
   e. E-waste (thiosulphate-based lixiviant): 50 mL made up to 100 mL with water (2× dilution), 1 mL of 70% nitric acid added.

Results:
For the thiosulphate-based lixiviant, the initial oxidation-reduction potential was measured to be between 230 and 260 mV (with respect to a standard hydrogen electrode); at the end of leaching, this was between 160 and 180 mV. For the thiourea-based lixiviant, these values were between 360-400 mV and 340-370 mV respectively. The starting colour of the thiosulphate-based lixiviant was light blue, changing to dark blue by the end of leaching. The starting colour of the thiourea-based lixiviant was pale orange, changing to colourless by the end of leaching (with white precipitate forming).

The dissolution of gold powder in lixiviant could be observed; for milled ore, no apparent change was obvious; while for the e-waste, discolouration and dissolution of gold plating could be observed. E-waste was not trialled with the thiourea-based lixiviant, although there is no reason to believe it would not give a similar result to the other feedstocks listed.

Total gold content was reported as mg/L based on the volume submitted for analysis, and used to calculate the amount leached from the feedstock, and the yield compared to the gold input mass where applicable (Table 5). Precision of total gold content was estimated at 15-20% variance.

TABLE 5

| Sample | Au input (mg) | Au content reported (mg/L [ppm]) | Au leached (mg) | Yield (% Au input) |
|---|---|---|---|---|
| Gold powder (thiosulphate lix.) | 18.800 | 28.000 | 14.000 (28.000 mg/L × 5 dilution × 0.1 L) | 75 |
| Gold powder (thiourea lix.) | 3.200 | 3.400 | 3.400 (3.400 mg/L × 10 dilution × 0.1 L) | 106 |
| Milled ore (thiosulphate lix.) | 0.400 | 1.300 | 0.260 (1.300 mg/L × 2 dilution × 0.1 L) | 65 |
| Milled ore (thiourea lix.) | 0.400 | 0.990 | 0.198 (0.990 mg/L × 2 dilution × 0.1 L) | 50 |
| E-waste (thiosulphate lix.) | 0.625* | 2.3 | 0.460 (2.300 mg/L × 2 dilution × 0.1 L) | 74* |

Lix., lixiviant;
*e-waste Au input estimated.

Example 3B Gold Dissolving Lixiviants

Materials and Methods:
Printed circuit boards were collected from discarded desktop computers, and sections with gold-plated connector pins were cut from the boards and used as a model e-waste feedstock.

1. Lixiviant solutions for gold were made as per the following:
   a. Iodine-based lixiviant: 0.1 M iodine, 37.5 mM potassium iodide; made up in water and left to stand for 2 hours prior to use.
   b. Acetic acid/peroxide-based lixiviant: 1.5 M hydrochloric acid, 0.6 M hydrogen peroxide, 0.6 M calcium chloride; made up in glacial acetic acid and stirred for 30 minutes prior to use. This lixiviant is similar to that disclosed in WO 2016/168933 AI, (Foley et al., 27 Oct. 2016 (27 Oct. 2016)).
   c. Acetic acid/hypochlorite-based lixiviant: 0.7 M hydrochloric acid, 0.25 M calcium hypochlorite; made up in glacial acetic acid.
   d. Acetic acid/chlorine-based lixiviant: 0.48 M hydrochloric acid was made up in glacial acetic acid, then charged with chlorine gas for 30 minutes prior to use.
   e. Aqua regia-based lixiviant: 9.6 M hydrochloric acid and 3.2 M nitric acid.
2. In separate glass reaction vessels, each lixiviant was reacted with e-waste feedstock as per the following:
   a. Iodine-based lixiviant: five ~1.5 cm lengths (~0.85 g total) of gold-plated connector pins were added to 10 mL of lixiviant and gently agitated at 22° C. for 1 hour.
   b. Acetic acid/peroxide-based lixiviant: a whole RAM board (17.3 g), complete with gold-plated connector pins, was added to 100 mL of lixiviant and stirred at 300 rpm using a stirrer bar at 22° C. for 2 hours.
   c. Acetic acid/hypochlorite-based lixiviant: ten portions of 500 g of whole RAM boards, complete with gold-plated connector pins, were added sequentially every 30 minutes to 2 L of lixiviant and stirred at 300 rpm using a stirrer bar at 22° C. for a total of 24 hours.
d. Acetic acid/chlorine-based lixiviant: 38.8 g of gold-plated connector pins were added to 100 mL of lixiviant and stirred at 500 rpm using a stirrer bar at 22° C. for 5 minutes.
e. Aqua regia-based lixiviant: 11.98 g of RAM integrated circuit chips, crushed to a powder, was added to 51 mL of lixiviant and stirred at 300 rpm using a stirrer bar at 22° C. for 16 hours.
f. Aqua regia-based lixiviant: a quarter of a RAM board (5.1 g), complete with gold-plated connector pins, was added to 50 mL of lixiviant and stirred at 300 rpm using a stirrer bar at 22° C. for 16 hours.

3. Reactions were filtered to separate depleted e-waste feedstock from the pregnant lixiviant solution. Samples were analysed for total gold content by atomic absorption spectrometry using a Shimadzu AA-6300 (Shimadzu Corp, Kyoto, Japan) as per the manufacturer's instructions.
   a. Sample aliquots were diluted appropriately to achieve an absorbance that fell within the dynamic range of the atomic absorption spectrometer, and total gold content back calculated accordingly.

Results:
The following observations were made during each reaction:
Iodine-based lixiviant: after 1 hour the connector pins had a dull grey powder covering the metal surface. When scraped, the dull grey powder came off leaving a copper-coloured metal pin. No gold was observed on the connector pins. It was hypothesised that the dull grey powder was insoluble copper iodide formed when the copper backing from the pins was exposed to the iodine solution upon the completion of gold dissolution.
Acetic acid/peroxide-based lixiviant: during the pre-contact stirring period (when the lixiviant was made), a deep yellow solution was formed after 30 minutes, with a small amount of calcium chloride remaining undissolved. During lixiviant contact, surface gold disappeared within minutes to reveal a tarnished underlying nickel and/or copper layer.
Acetic acid/hypochlorite-based lixiviant: the starting colour of the solution was deep yellow, with a small amount of calcium hypochlorite that remained undissolved. Upon addition of e-waste feedstock the solution turned deep green in colour, with the connector pins losing their surface gold to expose a tarnished layer of nickel and/or copper. No visible precipitate was observed.
Acetic acid/chlorine-based lixiviant: during the charging period, the solution became a deep yellow as it became saturated with chlorine. Upon addition of the connector pins the solution turned light yellow in colour, with all visible metals dissolving into solution. No visible precipitate was observed.
Aqua regia-based lixiviant (circuit chips crushed to powder): a starting colour of orange/yellow solution turned green after addition of the connector pins. All visible metals dissolved into solution, with no visible precipitates being observed.
Aqua regia-based lixiviant (quarter of a RAM board): a starting colour of orange/yellow solution turned green after addition of the RAM piece, with all visible metals dissolving into solution over time. No visible precipitate was observed.

Total gold content was reported as mg/L and used to calculate the amount leached from the feedstock, and the yield compared to the gold input mass where applicable (Table 6). Accuracy of total gold content was estimated at 20% variance.

The results for the aqua regia-based lixiviant show an improvement when the e-waste is pre-treated by grinding to a powder. The inventors believe this effect will be more pronounced when larger amounts of mixed e-waste is being processed by the method of the invention, particularly where the target metal is not on the surface of the e-waste.

TABLE 6

| Sample | Au input (mg) | Au content reported (mg/L [ppm]) | Au leached (mg) | Yield (% Au input) |
|---|---|---|---|---|
| (a) E-waste gold-plated connector pins (iodine lix.) | 5.3* | 500 | 5 (500 mg/L × 0.01 L) | 94.3% |
| (b) E-waste whole RAM board with gold-plated connector pins (acetic acid/peroxide lix.) | 7.5* | 84.2 | 8.42 (84.2 mg/L × 0.1 L) | 112% |
| (c) E-waste whole RAM boards with gold-plated connector pins, added sequentially (acetic acid/hypochlorite lix.) | 1700* | 846 | 1692 (846 mg/L × 2 L) | 99.5% |
| (d) E-waste gold-plated connector pins (acetic acid/chlorine lix.) | 210* | 2063 | 206.3 (2063 mg/L × 0.1 L) | 98.5% |
| (e) E-waste RAM integrated circuit chips, crushed to a powder (aqua regia lix.) | 14* | 271 | 13.55 (271 mg/L × 0.051 L) | 96.8% |
| (f) E-waste quarter of a RAM board (aqua regia lix.) | 1.2* | 20.4 | 1.02 (20.4 mg/L × 0.05 L) | 85% |

Lix., lixiviant;
*e-waste Au input estimated.

Example 4A Dissolving Gold from Ground Printed Circuit Boards and Base Metal Leach Materials and Methods:

As a model e-waste feedstock, printed circuit boards were collected from discarded desktop computers and ground to a particle size of <3 mm. This powder was then sieved to obtain a <1 mm particle size fraction, which was used for subsequent experiments.

1. To pre-treat e-waste powder in order to remove base metals, 1,200 g of <1 mm ground e-waste was treated with 5 M sulphuric acid as a ~30% w/v slurry for ~16 hours in a reactor with a mechanical stirrer at 200 rpm. 50% hydrogen peroxide added dropwise until a final concentration of ~7.5% was achieved.
   a. This treatment was repeated, with the resultant powder reduced in weight to 745 g.
   b. An additional treatment step was made on 125 g of this powder, consisting of 4 M nitric acid as a ~25% w/v slurry for ~48 hours in a reactor with a mechanical stirrer at 200 rpm.
2. Lixiviant solutions for gold were made as per the following:
   a. Hypochlorite lixiviant #1: 0.26 M calcium hypochlorite; made up in 5% acetic acid.
   b. Hypochlorite lixiviant #2: 0.26 M calcium hypochlorite, 90 mM calcium chloride; made up in 5% acetic acid.
   c. Chlorine gas lixiviant: chlorine gas was slowly sparged into 100 mL water. Chlorine gas was generated by dripping 25 mL of 32% hydrochloric acid onto 30 g of 65% calcium hypochlorite in a separate flask dropwise over 1 hour.
   d. Acetic acid/chlorine gas lixiviant: chlorine gas was slowly sparged into 100 mL of 5% acetic acid solution. Chlorine gas was generated as above.
   e. Thiourea lixiviant: 0.32 M thiourea, 0.11 M ferric chloride; made up in water and adjusted to pH 1 with 98% sulphuric acid.
3. In separate glass reaction vessels, each lixiviant was reacted with ground powder as per the following:
   a. Hypochlorite lixiviant #1: 16.1 g of untreated powder was placed into 100 mL of lixiviant in a flat-bottomed reaction flask and stirred using a stirrer bar to keep the powder suspended at an initial temperature of 22° C. for 1 hour.
   b. Hypochlorite lixiviant #2: 20 g of pre-treated powder from step 1(a) was placed into 100 mL of lixiviant in a flat-bottomed reaction flask and stirred using a stirrer bar to keep the powder suspended at an initial temperature of 22° C. for 1 hour.
   c. Thiourea lixiviant: 20 g of pre-treated powder from step 1(a) was placed into 100 mL of lixiviant and stirred using a stirrer bar to keep the powder suspended at an initial temperature of 22° C. for ~16 hours.
   d. Chlorine gas lixiviant, acetic acid/chlorine gas lixiviant: 10 g of pre-treated powder from step 1(a) was placed into 100 mL of lixiviant in a round-bottomed reaction flask prior to starting the chlorine gas sparge, and stirred using a stirrer bar to keep the powder suspended at an initial temperature of 22° C. for 2 hours.
4. In addition, nitric acid treated powder from step 1(b) was treated as per steps 3(b) & 3(c), with the following alterations:
   a. Hypochlorite lixiviant: reaction time of 2.5 hours.
   b. Thiourea lixiviant: reaction time of 9 hours.
5. Samples were taken from each reaction and filtered to separate e-waste powder from the pregnant lixiviant solution. Each clarified solution was then analysed for total gold content by atomic absorption spectrometry using a Shimadzu AA-6300 (Shimadzu Corp, Kyoto, Japan) as per the manufacturer's instructions.
   a. Sample aliquots were diluted appropriately to achieve an absorbance that fell within the dynamic range of the atomic absorption spectrometer, and total gold content back calculated accordingly.

Results:

Total gold content was reported as mg/L and used to calculate the amount leached from the feedstock, and the yield compared to the gold input mass where applicable (Table X). Accuracy of total gold content was estimated at 20% variance.

The results indicated that sulphuric acid pre-treatment of ground e-waste powder to minimise base metal content (base metal leach) improved the leached gold yield markedly. The various lixiviants trialled on pre-treated powder obtained yields ranging from 35-84%; the additional nitric acid treatment in step 1(b) increased the yield from the thiourea lixiviant from 70% to 76%.

TABLE 7

| No. | Sample | Au input (mg) | Au content reported (mg/L [ppm]) | Au leached (mg) | Yield (% Au input) |
| --- | --- | --- | --- | --- | --- |
| 1 | Ground e-waste, no pre-treatment (hypochlorite lix. #1) | 3.9 | 3.9 | 0.4 (3.9 mg/L × 0.1 L) | 10% |
| 2 | Ground e-waste, pre-treatment 1(a) (hypochlorite lix. #2) | 7.4 | 62.0 | 6.2 (62.0 mg/L × 0.1 L) | 84% |
| 3 | Ground e-waste, pre-treatment 1(a) (thiourea lix.) | 7.4 | 51.6 | 5.2 (51.6 mg/L × 0.1 L) | 70% |
| 4 | Ground e-waste, pre-treatment 1(a) (chlorine gas lix.) | 3.7 | 13.0 | 1.3 (13.0 mg/L × 0.1 L) | 35% |
| 5 | Ground e-waste, pre-treatment 1(a) (acetic acid/chlorine gas lix.) | 3.7 | 14.9 | 1.5 (14.9 mg/L × 0.1 L) | 41% |

TABLE 7-continued

| No. | Sample | Au input (mg) | Au content reported (mg/L [ppm]) | Au leached (mg) | Yield (% Au input) |
|---|---|---|---|---|---|
| 6 | Ground e-waste, pre-treatment 1(b) (hypochlorite lix. #2) | 8.4 | 61.9 | 6.2 (61.9 mg/L × 0.1 L) | 74% |
| 7 | Ground e-waste, pre-treatment 1(b) (thiourea lix.) | 8.4 | 64.1 | 6.4 (64.1 mg/L × 0.1 L) | 76% |

Lix., lixiviant.

Example 4B Dissolving Gold from Ground Printed Circuit Boards and Base Metal Leach Materials and Methods:

As a model e-waste feedstock, printed circuit boards were collected from discarded desktop computers and ground to a particle size of <3 mm. Some of this powder was then sieved to obtain a <1 mm particle size fraction.

1. To pre-treat e-waste powder in order to remove base metals, powder was treated with 5 M hydrochloric acid as a ~20% w/v slurry in a reactor with a mechanical stirrer at 200 rpm while sparging with air. Specifically:
   a. 200 g of <3 mm ground e-waste was treated for ~16 hours while sparging with air at ~14 L/min. The resultant powder reduced in weight to 116.4 g.
   b. 300 g of <1 mm ground e-waste was treated for ~48 hours while sparging with air at ~20 L/min. The resultant powder reduced in weight to 164 g.
   c. 10 kg of <3 mm ground e-waste was treated for ~48 hours while sparging with air at ~50 L/min. The resultant powder reduced in weight to 5,405 g.
2. Lixiviant solutions for gold were made as per the following:
   a. Hypochlorite lixiviant: 0.26 M calcium hypochlorite; made up in 3% acetic acid.
   b. Thiourea lixiviant: 0.32 M thiourea, 0.11 M ferric chloride; made up in water and adjusted to pH 1 with 98% sulphuric acid.
   c. Iodine lixiviant: 39 mM iodine, 241 mM potassium iodide; made up in water.
3. Each lixiviant was reacted with pre-treated powder as per the following:
   a. Hypochlorite lixiviant: 116.4 g of powder from step 1(a) was placed into 1,100 mL of lixiviant and stirred in a reactor with a mechanical stirrer at 200 rpm at an initial temperature of 22° C. for 2 hours.
   b. Thiourea lixiviant: 164 g of powder from step 1(b) was placed into 820 mL of lixiviant and stirred in a reactor with a mechanical stirrer at 200 rpm at 22° C. for ~18 hours.
   c. Iodine lixiviant: 10 g of powder from step 1(c) was placed into 100 mL of lixiviant in a flat-bottomed glass flask and stirred using a stirrer bar to keep the powder suspended at 22° C. for 16 hours.
4. Samples were taken from each reaction and filtered to separate e-waste powder from the pregnant lixiviant solution. Each clarified solution was then analysed for total gold content by atomic absorption spectrometry using a Shimadzu AA-6300 (Shimadzu Corp, Kyoto, Japan) as per the manufacturer's instructions.
   a. Sample aliquots were diluted appropriately to achieve an absorbance that fell within the dynamic range of the atomic absorption spectrometer, and total gold content back calculated accordingly.

Results:

Total gold content was reported as mg/L and used to calculate the amount leached from the feedstock, and the yield compared to the gold input mass where applicable (Table 8). Accuracy of total gold content was estimated at 20% variance.

The results indicated that hydrochloric acid pre-treatment of ground e-waste powder to minimise base metal content improved the leached gold yield markedly (with respect to ground e-waste with no base metal leach in Example 4A, Table 7 No. 1, i.e. 10% yield).

TABLE 8

| Sample | Au input (mg) | Au content reported (mg/L [ppm]) | Au leached (mg) | Yield (% Au input) |
|---|---|---|---|---|
| <3 mm Ground e-waste, pre-treated with hydrochloric acid (hypochlorite lix.) | 33 | 20.4 | 22.4 (20.4 mg/L × 1.1 L) | 68% |
| <1 mm Ground e-waste, pre-treated with hydrochloric acid (thiourea lix.) | 80 | 76.8 | 63.0 (76.8 mg/L × 0.82 L) | 79% |
| <3 mm Ground e-waste, pre-treated with hydrochloric acid (iodine lix.) | 4.2 | 28.7 | 2.9 (28.7 mg/L × 0.1 L) | 69% |

Lix., lixiviant.

Background Example 5 Chlorine Lixiviant

Materials and Methods:

As a model e-waste feedstock, printed circuit boards were collected from discarded desktop computers and sections with gold-plated connector pins were cut from the boards.

1. Five ~1 cm² gold-plated pin sections of e-waste (1.21 g total mass) were placed in a flat-bottomed reaction flask, and 100 mL of water added. The flask was placed on a magnetic stirring plate, and a stirring flea added. Stirring took place at a speed suitable to keep the e-waste moving around the flask.
2. Chlorine gas was slowly sparged into the reaction liquid to form a chlorine-based lixiviant.
   a. Chlorine gas was generated by dripping 12 mL of 32% hydrochloric acid onto 3 g of potassium permanganate in a separate flask at 9 mL/hour using a syringe pump.
   b. Excess chlorine gas from the e-waste reaction flask was allowed to escape via sparging into 50 mL of a 7 mM sodium thiosulphate pentahydrate solution in order to neutralise.
3. After 7 hours, the reaction was observed to be complete, and the pregnant lixiviant was decanted into a separate flask.
4. 5 mL of the pregnant lixiviant was sent for analysis for total gold content by inductively coupled plasma mass spectrometry (service provided by University of Auckland Mass Spectrometry Centre, Auckland, New Zealand).

Results:

Total gold content was reported as mg/L based on the volume submitted for analysis, and used to calculate the amount leached from the feedstock (Table 7). Precision of total gold content was estimated at 15-20% variance.

TABLE 9

| Sample | Au content reported (mg/L [ppm]) | Au leached (mg) | Au proportion of entire e-waste mass (%) |
|---|---|---|---|
| E-waste (chlorine lixiviant) | 94.880 | 9.488 (94.880 mg/L × 0.1 L) | 0.8 (9.488 mg ÷ 1.21 g e-waste) |

Background Example 6 Biosorption from Chlorine Solution

Materials and Methods:

Microorganism cultures were grown under aseptic conditions, but subsequent processing took place using non-sterile solutions and equipment.

Chlorine-based lixiviant that was pregnant with gold from an e-waste feedstock was generated as per Example 5.

1. 25 mL of nutrient broth (0.5% peptone, 0.3% yeast extract) was inoculated with *Cupriavidus metallidurans* strain CH34 (Deutsche Sammlung von Mikroorganismen und Zellkulturen GmbH #2839) and grown for at least 16 hours to stationary phase at 30° C., ~200 rpm.
2. The culture was centrifuged at 4,000 rcf for 12 minutes, the supernatant discarded, and the pellet (~0.1 g) resuspended in 30 mL of 0.85% saline solution to wash. This centrifuge/wash step was repeated a second time.
3. The culture was centrifuged again as above, and the supernatant discarded.
4. 30 mL of chlorine-based lixiviant pregnant with gold from an e-waste feedstock (~95 ppm Au) was sparged gently with air for 45 minutes to drive off remaining chlorine gas, and the pH adjusted to 4.5-5.0 with sodium hydroxide. This solution was then used to resuspend the microorganism pellet from step 3.
5. The gold/microorganism mixture was incubated at room temperature for 22 hours. To keep the microorganism in suspension, the mixture was gently agitated on an orbital shaker throughout.
6. The mixture was centrifuged as per step 2, and the supernatant decanted and stored at 4° C. The pellet was resuspended in 30 mL of water to wash and centrifuged as per step 2.
7. The supernatant was discarded, and the pellet resuspended in 2 mL water. This was stored at 4° C.
8. The following samples were analysed for total gold content by inductively coupled plasma mass spectrometry (service provided by University of Auckland Mass Spectrometry Centre, Auckland, New Zealand):
   a. Barren supernatant (step 6): 5 mL.
   b. Biosorption pellet (step 7): 1 mL.

Results:

Total gold content was reported as mg/L based on the volume submitted for analysis, and used to calculate the amount biosorbed and biosorption yield (Table 10). Precision of total gold content was estimated at 15-20% variance.

TABLE 10

| Sample | Au input (mg) | Au content reported (mg/L [ppm]) | Au biosorbed (mg) | Yield (% Au input) |
|---|---|---|---|---|
| *C. metallidurans* barren supernatant | 2.850 | 48.650 | 1.46 (48.65 mg/L × 0.03 L)) | 51 (49% biosorbed) |
| *C. metallidurans* biosorption pellet | 2.850 | 656.900 | 1.314 (656.9 mg/L × 0.002 L) | 46 |

Using these results, the concentration factor from the biosorption process was calculated (Table 11).

TABLE 11

| Sample | Au input concentration (mg/L [ppm]) | Au output concentration (mg/L [ppm]) | Increase in Au concentration |
|---|---|---|---|
| *C. metallidurans* | 95 | 657 | 6.9 |

Background Example 7 Recovery of Laden Microorganism from Barren Aqueous Solutions Materials and Methods:
Microorganism cultures were grown under aseptic conditions, but subsequent processing took place using non-sterile solutions and equipment.
As an example, gold/microorganism mixtures were prepared as per Example 6.
1. To separate the gold laden microorganism from barren lixiviant solution, samples were processed by either centrifugation or filtering:
    a. Centrifugation: mixtures were centrifuged at 3,000 to 8,000 rcf for at least 10 minutes, and the barren lixiviant supernatant decanted from the gold laden microorganism pellet. For washing, the pellet was resuspended in a volume of wash solution, and subsequently recovered through another centrifugation step.
    b. Filtering: mixtures were applied to 0.45 μm PVDF filters under ~20 cm Hg vacuum for several minutes until all liquid had passed through. The filtrate was barren lixiviant, and the residue the gold laden microorganism. For washing, a volume of wash solution was added to the residue and filtered through under vacuum. Residue was recovered by washing the filter in a 50 mL Falcon tube with a volume of wash solution until the gold laden microorganism was resuspended, and the filter subsequently discarded.

Results:
Both centrifugation or filtration served adequately to separate barren lixiviant solution from the gold laden microorganism.

Background Example 8 Selectivity of Microorganism for Gold from Gold/Copper Solution Materials and Methods:
Microorganism cultures were grown under aseptic conditions, but subsequent processing took place using non-sterile solutions and equipment.
1. 120 mL of *Cupriavidus metallidurans* strain CH34 was cultured as per Example 1.
2. The culture was split into 6 equal aliquots, centrifuged at 4,350 rcf for 10 minutes, the supernatant discarded, and the pellets resuspended in 30 mL of 0.85% saline solution to wash. This centrifuge/wash step was repeated a total of 2 times, with the final wash supernatant discarded.
3. Pellets (averaging 0.15 g wet weight) were resuspended in 30 mL of a 2-fold chloroauric acid serial dilution, ranging from 325 μM (~64 ppm) to 10 μM (~2 ppm) chloroauric acid made up in 0.85% saline solution at an original adjusted pH of 5.5.
4. Copper chloride was also added to each dilution sample prior to pellet resuspension to a final concentration of 32.5 mM (2,060 ppm).
5. The gold/copper/microorganism mixture was incubated at room temperature for 4 hours. To keep the microorganism in suspension, the mixture was gently agitated on an orbital shaker throughout.
6. The mixture was centrifuged as per step 2, and the supernatant set aside. Pellets were resuspended/washed with water as per step 2, and finally resuspended in 1.2 mL water (total volume estimated at 1.3 mL).
7. Half (0.65 ml) of each sample from step 5 was digested in 4 mL of acid mix (3 mL 69% nitric acid, 1 mL) and then analysed for total gold and copper content by inductively coupled plasma mass spectrometry (service provided by University of Auckland Mass Spectrometry Centre, Auckland, New Zealand).

Results:
Total metal content was reported as mg/L based on the volume submitted for analysis, and used to calculate the amount biosorbed and biosorption yield (Table 10). Precision of total gold content was estimated at 15-20% variance.

TABLE 12

| Sample | Metalinput (mg) | Metal content reported (mg/L [ppm]) | Metal biosorbed (mg) | Yield (% metal input) | Change in mass ratio Au:Cu from input to biosorbed (factor of change in mass ratio) |
|---|---|---|---|---|---|
| 325 μM Au | 1.92 Au<br>62 Cu | 177.1 Au<br>20.0 Cu | 1.65 Au<br>(177.1 mg/L ×<br>0.00465 L ×<br>2)<br>0.19 Cu | 84.4% Au<br>0.3% Cu | 1:32 to 9:1<br>(288 increase) |
| 163 μM Au | 0.96 Au<br>62 Cu | 109.6 Au<br>18.4 Cu | 1.02 Au<br>0.17 Cu | 106% Au<br>0.3% Cu | 1:62 to 5:1<br>(310 increase) |
| 81 μM Au | 0.48 Au<br>62 Cu | 81.8 Au<br>22.9 Cu | 0.76 Au<br>0.21 Cu | 158% Au<br>0.3% Cu | 1:124 to 4:1<br>(496 increase) |
| 41 μM Au | 0.24 Au<br>62 Cu | 41.5 Au<br>32.8 Cu | 0.39 Au<br>0.30 Cu | 163% Au<br>0.5% Cu | 1:258 to 1:1<br>(258 increase) |
| 20 μM Au | 0.12 Au<br>62 Cu | 21.2 Au<br>38.2 Cu | 0.20 Au<br>0.35 Cu | 167% Au<br>0.6% Cu | 1:517 to 1:2<br>(259 increase) |
| 10 μM Au | 0.06 Au<br>62 Cu | 10.4 Au<br>32.2 Cu | 0.10 Au<br>0.30 Cu | 167% Au<br>0.5% Cu | 1:1033 to 1:3<br>(344 increase) |

This shows a microorganism (in this case *C. metallidurans*) can selectively biosorb metals. In this case gold was very selectively biosorbed over copper. This allows metals to be selectively separated in a separating step, i.e. separating the metal laden microorganism from the barren solution. In this case the gold laden microorganism can be separated from the barren solution which retained much of the copper.

It can be seen from Table 12 that the mass ratio of gold to copper changes after biosorption. For example, in the sample "325 µM Au", the gold to copper ratio in the metal input is approximately 1:32; after biosorption, the ratio is found to be approximately 9:1 in favour of gold. This results in a 288-fold increase in the mass ratio. In a similar manner for the sample "10 µM Au", the gold to copper ratio increases from 1:1,000 to 1:3, an enrichment of over 300-fold with respect to copper.

Example 9 Selectivity of Microorganism for Gold from e-Waste Leachate

Materials and Methods:
Microorganism cultures were grown under aseptic conditions as per Example 1, but subsequent processing took place using non-sterile solutions and equipment.

Chlorine-based lixiviant that was pregnant with gold from an e-waste feedstock was generated as per Example 3B, and had been gently sparged with air for at least 10 minutes to drive off remaining chlorine gas.

1. Three 20 mL aliquots of stationary phase *Cupriavidus metallidurans* strain CH34 were centrifuged at 4,350 rcf for 10 minutes and the supernatant discarded. Two of the pellets were resuspended in 20 mL of 0.85% saline solution to wash and pelleted again, while one pellet was left unwashed.

2. One of the washed pellets was resuspended in 1 mL of pregnant chlorine-based lixiviant (~1,100 ppm Au; ~25,100 ppm Cu; ~3,150 ppm Ni). The second wash pellet and unwashed pellet were separately resuspended in 0.5 mL of the same with the addition of 4.5 mL water.

3. The pregnant lixiviant/microorganism mixture was incubated at room temperature for 2 hours. To keep the microorganism in suspension, the mixture was gently agitated on an orbital shaker throughout.

4. The mixture was centrifuged as per step 1, and the supernatant set aside. The pellet was resuspended in 30 mL of water to wash and centrifuged as per step 1, and the wash supernatant discarded.

5. The supernatant was discarded, and each pellet digested in 4 mL of aqua regia (see Example 3B) at room temperature for 2 hours.

6. Samples were analysed for total gold, copper and nickel content by atomic absorption spectrometry as per Example 3B.

Results:
Total metal content was reported as mg/L and used to calculate the amount of each metal biosorbed and biosorption yield (Table 13). Accuracy of total metal content was estimated at 15-20% variance.

TABLE 13

| Sample | Metal input (mg) | Metal content reported (mg/L [ppm]) | Metal biosorbed (mg) | Yield (% metal input) |
|---|---|---|---|---|
| Washed pellet (contacted with neat lixiviant) | 1.10 Au<br>25.10 Cu<br>3.15 Ni | 132.7 Au<br>15.0 Cu<br>2572.6 Ni* | 0.53 Au (132.7 mg/L × 0.004 L)<br>0.06 Cu<br>0.58 Ni (3.15 mg − [2,572.6 mg/L × 0.001 L]) | 48.2% Au<br>0.2% Cu<br>18.4% Ni |
| Washed pellet (contacted with diluted lixiviant) | 0.55 Au<br>12.55 Cu<br>1.58 Ni | 115.5 Au<br>15.1 Cu<br>264.4 Ni* | 0.46 Au (115.5 mg/L × 0.004 L)<br>0.06 Cu<br>0.26 Ni (1.58 mg − [264.4 mg/L × 0.005 L]) | 83.6% Au<br>0.5% Cu<br>16.5% Ni |
| Unwashed pellet (contacted with diluted lixiviant) | 0.55 Au<br>12.55 Cu<br>1.58 Ni | 115.8 Au<br>15.1 Cu<br>256.6 Ni* | 0.46 Au (115.8 mg/L × 0.004 L)<br>0.06 Cu<br>0.30 Ni (1.58 mg − [256.6 mg/L × 0.001 L]) | 83.6% Au<br>0.5% Cu<br>19.0% Ni |

*= metal content reported for depleted supernatant, not digested pellet.

Example 10 Base Metal Leaching

Materials and Methods:
Printed circuit boards were collected from discarded desktop computers and ground to a particle size of <3 mm. Samples of this powder was treated with three acids: nitric acid (HNO3), sulfuric acid (H2SO4) and hydrochloric acid (HCl).

1. 100 mL of each acid (0.5M) was mixed up from concentrate and put in a glass reaction vessel.

2. To each acid, 10 g of ground powder was added and the solution was allowed to react over a 48 hour period while being stirred to maintain suspension of the powder in solution.

3. Samples were taken from each reaction and filtered to separate e-waste powder from the base metal leach solution. Each clarified solution was then analysed for total gold content by atomic absorption spectrometry using a Shimadzu AA-6300 (Shimadzu Corp, Kyoto, Japan) as per the manufacturer's instructions. Sample aliquots were diluted appropriately to achieve an absorbance that fell within the dynamic range of the atomic absorption spectrometer, and total gold content back calculated accordingly.

Results:

Total dissolved metal was calculated as a percentage of total metal available for dissolution (Table 14). While the original metal composition of the printed circuit boards is unknown, it is clear by comparison of the results for the different acids (base metal leaches) in Table 14 that different base metal leaches (in this case acids) have different solubility for different metals. In particular, where base metals such as copper, zinc, aluminium, iron, and/or tin are the non-target metal(s) and gold is the target metal, the base metal leach can be selected accordingly. Th results show use of sulfuric acid is preferable to nitric acid and hydrochloric acid as a base metal leach, particularly when gold is the target metal.

TABLE 14

Percentage of metals dissolved.

|   | Gold | Copper | Nickel | Tin | Lead | Iron |
|---|---|---|---|---|---|---|
| HCl | 3.67 | 2.53 | 1.82 | 76.29 | 77.70 | 91.28 |
| $HNO_3$ | 0.83 | 78.87 | 9.39 | 19.64 | 76.21 | 87.55 |
| $H_2SO_4$ | 0.00 | 0.009 | 1.44 | 74.05 | 9.33 | 92.71 |

Example 11A Selectivity of Microorganism for Gold from e-Waste Leachate after Undergoing a Base Metal Leach Materials and Methods:

*Cupriavidus metallidurans* strain CH34 was grown and harvested in a similar manner to Example 1, except at a 20 L scale in a suitable bioreactor. Subsequent processing took place using non-sterile solutions and equipment.

1. 7.14 kg of RAM boards had their gold-plated connector pins removed and treated with 1.7 L of 2 M sulfuric acid, with 0.3 L of 50% hydrogen peroxide being added in small aliquots over one hour (causing the solution temperature to increase from 22° C. to ~80° C.). After 3 hours the majority of base metals present in the connector pins were judged visually to have been removed.
2. Solids from step 1 were removed through filtration and treated with 725 mL of a chlorine-based lixiviant (generated in a similar manner to Example 3B) at 22° C. for 30 minutes to generate a lixiviant pregnant with gold.
3. 250 mL of this pregnant lixiviant solution containing gold, copper and nickel was gently sparged with air for 10 minutes to drive off remaining free chlorine, and then contacted with 84 g of wet *C. metallidurans* biomass at 22° C. for 2.25 hours under gentle agitation.
4. The mixture was centrifuged for 40 minutes at 4,000 rcf in centrifuge jars, and the supernatant set aside. Pellets were resuspended in 1.1 L water to wash and then centrifuged again. The wash supernatant was set aside.
5. The pelleted metal-laden biomass was spread on trays and allowed to dry over 72 hours, giving a dry mass of approximately 22 g.
6. 125 mg of this dry biomass was ground, digested in 4 mL aqua regia, and analysed for total gold, copper and nickel content by atomic absorption spectrometry using a Shimadzu AA-6300 (Shimadzu Corp, Kyoto, Japan) as per the manufacturer's instructions.

Results:

Total metal content was reported as mg/L and used to calculate the amount of each metal biosorbed and biosorption yield (Table 15). Accuracy of total metal content was estimated at 15-20% variance.

TABLE 15

| Sample | Metal input (mg) | Metal content reported (mg/L [ppm]) | Metal mass contained (mg) | Yield (% metal input) |
|---|---|---|---|---|
| Pregnant chlorine-based lixiviant (250 mL) | 853 Au* 17,987 Cu* 2,369 Ni* | 3,589.3 Au 527.8 Cu 68.2 Ni | 897.3 Au (3,589.3 mg/L × 0.25 L) 132.0 Cu 17.1 Ni | 105% Au 0.7% Cu 0.7% Ni |
| *C. metallidurans* dried biomass (125 mg) | 5.09 Au 0.75 Cu 0.10 Ni | 1,132.7 Au 52.7 Cu 2.6 Ni | 4.53 Au (1,132.7 mg/L × 0.004 L) 0.21 Cu 0.01 Ni | 89.0% Au 28.0% Cu 10.0% Ni |
| *C. metallidurans* dried biomass (extrapolated to 22 g total dried biomass) | 897.3 Au 132.0 Cu 17.1 Ni | — | 797.5 Au ([1,132.7 mg/L × 0.004 L]/ 0.125 g × 22 g) 37.1 Cu 1.8 Ni | 88.9% Au 28.1% Cu 10.5% Ni |

*= estimated metal mass contained in pregnant lixiviant (250 mL).

Using the data in Table 15, the concentration factor from the biosorption process from 250 mL lixiviant and subsequent drying was calculated using the dry metal-laden biomass of 22 grams (Table 16).

TABLE 16

| Sample | Metal input concentration (mg/L [ppm]) | Metal output concentration (mg/kg [ppm]) | Increase in metal concentration (concentration factor) |
|---|---|---|---|
| C. metallidurans biosorption pellet | 3,589.3 Au<br>527.8 Cu<br>68.2 Ni | 36,250 Au<br>(797.5 mg ÷ 0.022 kg)<br>1,686 Cu<br>82 Ni | 10.1 Au<br>3.2 Cu<br>1.2 Ni |

It can be seen that while gold increases in concentration by a factor of ~10 (to ~3.6% of the biomass weight), copper only increases in concentration by a factor of ~3, while nickel is found at similar levels.

Example 11B Selectivity of Microorganism for Gold from e-Waste Leachate after Undergoing a Base Metal Leach Materials and Methods:
*Cupriavidus metallidurans* strain CH34 was grown and harvested in a similar manner to Example 1. Subsequent processing took place using non-sterile solutions and equipment.

Lixiviants that were pregnant with gold (as well as other base metals) from ground printed circuit board stock were generated as per Example 4A and 4B.

1. Iodine pregnant lixiviant from HCl pre-treated powder: 6 mL of pregnant lixiviant, generated similarly to Example 4B, step 2c containing 68 ppm gold was diluted to 20 mL with water to give 20.5 ppm gold (0.41 mg total). 410 mg of wet *C. metallidurans* biomass (820 µL from a ~500 mg/mL stock) was added to this solution to give an Au:microbe (cell wet weight) ratio of ~1:1,000.
   a. The gold/microbe mixture was incubated at 22° C. for 2.75 hours. To keep in suspension, the mixture was gently agitated on an orbital shaker throughout.
   b. The mixture was centrifuged as per Example 1 to recover a post-biosorption supernatant.
2. Hypochlorite pregnant lixiviant from HCl pre-treated powder: ~600 mL of pregnant lixiviant from Example 4B, step 3a was sparged with air at 4 L/min for 1 hour to remove excess free chlorine. 30 mL of this sparged lixiviant containing 20.4 ppm gold (0.61 mg total) was contacted with 245 mg of wet *C. metallidurans* biomass (490 µL from a ~500 mg/mL stock) to give an Au:microbe (cell wet weight) ratio of ~1:400.
   a. The gold/microbe mixture was incubated at 22° C. for 2 hours. To keep in suspension, the mixture was gently agitated on an orbital shaker throughout.
   b. The mixture was centrifuged as per Example 1 to recover a post-biosorption supernatant.
3. Hypochlorite pregnant lixiviant from $H_2SO_4$ pre-treated powder: ~3.3 L of pregnant lixiviant, generated similarly to Example 4B, step 3a was sparged with air at 8 L/min for 2.75 hours to remove excess free chlorine. 3 L of this sparged lixiviant containing 35.2 ppm gold (105.7 mg) was contacted with 20.4 g of wet *C. metallidurans* biomass (40.8 mL from a ~500 mg/mL stock) to give an Au:microbe (cell wet weight) ratio of ~1:200.
   a. The gold/microbe mixture was incubated at 22° C. for 3 hours. To keep in suspension, the mixture was gently agitated on an orbital shaker throughout.
   b. The mixture was centrifuged as per Example 1 to recover a post-biosorption supernatant.
4. Samples of post-biosorption supernatant from the steps above were analysed by atomic absorption spectrometry using a Shimadzu AA-6300 (Shimadzu Corp, Kyoto, Japan) as per the manufacturer's instructions, and the metal biosorbed calculated by subtracting the post-biosorption supernatant metal content from the measured metal input content of each reaction.

Results:
Total metal content was reported as mg/L and used to calculate the amount of each metal biosorbed and biosorption yield (Table 17). Accuracy of total metal content was estimated at 15-20% variance.

TABLE 17

| Sample | Metal input (mg) | Metal content reported in post-biosorption supernatant (mg/L [ppm]) | Metal biosorbed (inferred mg) | Biosorption yield (% metal input) |
|---|---|---|---|---|
| Pregnant iodine-based lixiviant (20 mL; HCl pre-treated powder) 1:1,000 Au:microbe | 0.41 Au | 17.1 Au | 0.07 Au (0.41 − [17.1 mg/L × 0.02 L]) | 17% Au |
| Pregnant hypochlorite-based lixiviant (30 mL; HCl pre-treated powder) 1:400 Au:microbe | 0.61 Au<br>24.4 Cu<br>0.39 Ni | 3.0 Au<br>710 Cu<br>12.0 Ni | 0.52 Au<br>3.1 Cu<br>0.02 Ni | 85% Au<br>13% Cu<br>5% Ni |
| Pregnant hypochlorite-based lixiviant (3 L; $H_2SO_4$ pre-treated powder) 1:200 Au:microbe | 105.7 Au<br>5,806.9 Cu<br>131.7 Ni<br>25.0 Fe<br>57.5 Pb<br>177.9 Zn<br>2.0 Pd | 4.0 Au<br>1,423.6 Cu<br>40.5 Ni<br>6.9 Fe<br>14.1 Pb<br>50.8 Zn<br>0.1 Pd | 93.7 Au (105.6 − [4.0 mg/L × 3 L])<br>1,536.1 Cu<br>10.1 Ni<br>4.4 Fe<br>15.0 Pb<br>25.6 Zn<br>1.7 Pd | 89% Au<br>26% Cu<br>8% Ni<br>18% Fe<br>26% Pb<br>14% Zn<br>84% Pd |

Biosorption of gold and palladium proceeds well from the pregnant hypochlorite lixiviants, but does not occur as favourably from the pregnant iodine lixiviant.

Using the data in Table 17, the concentration factor from the biosorption process was calculated by comparing the metal concentration of the input pregnant lixiviant to the metal concentration in the output metal loaded biomass. The metal loaded biomass, measured as a wet weight, was extrapolated to an estimated dry weight by dividing its mass by five (Luria, The Bacteria, vol. 1. Academic Press, Inc., New York, pp 1-34 (1960)).

TABLE 18

| Sample | Metal input concentration (mg/L [ppm]) | Metal output concentration (mg/kg [ppm]; extrapolated biomass dry weight) | Increase in metal concentration (concentration factor) |
|---|---|---|---|
| Pregnant iodine-based lixiviant (20 mL; HCl pre-treated powder) 1:1,000 Au:microbe | 20.5 Au | 853.7 Au (0.07 mg ÷ [0.00041 kg × 20%]) | 40.6 Au |
| Pregnant hypochlorite-based lixiviant (30 mL; HCl pre-treated powder) 1:400 Au:microbe | 20.4 Au 813.3 Cu 13.0 Ni | 10.612.2 Au (0.52 mg ÷ [0.000245 kg × 20%]) 63,265.3 Cu 408.2 Ni | 520.2 Au 77.8 Cu 31.4 Ni |
| Pregnant hypochlorite-based lixiviant (3 L; $H_2SO_4$ pre-treated powder) 1:200 Au:microbe | 35.2 Au 1,935.6 Cu 43.9 Ni 8.3 Fe 19.2 Pb 59.3 Zn 0.7 Pd | 22,955.3 Au (93.7 mg ÷ [0.0204 kg × 20%]) 376,493.8 Cu 2,473.2 Ni 1,081.4 Fe 3,671.1 Pb 6,284.1 Zn 406.6 Pd | 652.1 Au 194.5 Cu 56.3 Ni 129.5 Fe 191.6 Pb 106.0 Zn 618.0 Pd |

It can be seen that while all metals are concentrated by biosorption, gold and palladium are increased in concentration significantly more than any other base metal.

Background Example 12 Recovery of Metal from Microorganism by Smelting

Materials and Methods:

Samples of metal laden microorganism (previously determined by atomic absorption spectrometry to contain 36,250 mg/kg [ppm] gold, 1,686 mg/kg copper, and 82 mg/kg nickel; see Example 11A) were incinerated to remove organic matter and recover biosorbed metals.

1. 0.5 g of dried metal laden microorganism powder was mixed with equal portions of sodium tetraborate flux and placed in a crucible.
2. The mixture was carefully heated with a methylacetylene propadiene propane gas torch until the flux began to liquefy. The intensity of the flame was then gradually increased and the organic matter slowly burnt off.
3. The molten metal residue remaining in the crucible was coagulated into a single mass, allowed to cool, and subsequently weighed.
4. The cooled metal button was digested in 4 mL aqua regia, and the resultant solution analysed for total gold, copper and nickel content by atomic absorption spectrometry using a Shimadzu AA-6300 (Shimadzu Corp, Kyoto, Japan) as per the manufacturer's instructions.
   a. Sample aliquots were diluted appropriately to achieve an absorbance that fell within the dynamic range of the atomic absorption spectrometer, and metal content back calculated accordingly.

Results:
The mass of the metal button achieved after smelting was 20.94 mg. Total metal content was reported as mg/L and used to calculate the metal yield (Table 19). Accuracy of total metal content was estimated at 15-20% variance.

TABLE 19

| Sample | Metal input (mg) | Metal content reported (mg/L [ppm]) | Metal recovered (mg) | Yield (% metalinput) |
|---|---|---|---|---|
| Metal button from smelt | 18.12 Au (36,250 mg/kg × 0.0005 kg) 0.84 Cu 0.04 Ni | 5,493 Au 238 Cu 0 Ni | 21.97 Au (5,493 mg/L × 0.004 L) 0.95 Cu 0 Ni | 121% Au 113% Cu 0% Ni |

Background Example 13 Recovery of Gold from a Microorganism by Chemical Dissolution and Precipitation Materials and Methods:
Similarly to Example 12, biosorbed metal was recovered from the metal-laden microorganism by using a chlorine-based lixiviant extraction.
1. 100 mL of water was placed in a reaction vessel and charged with gaseous chlorine for 45 mins.
2. 0.3 g of dried metal-laden microorganism powder (see Example 1A) was added to the lixiviant and allowed to react overnight while gently stirring.
3. The solution was then sparged with air to remove excess chlorine, and 0.5 g of sodium metabisulfite added to precipitate metal ions, such as gold, out of the solution.

Results:
The metal content of the metal laden microorganism powder was previously determined to be 36,250 ppm Au, 1,686 ppm Cu, and 82 ppm Ni (see Example 11A). A visible precipitate formed in the solution after leaving for 24 hours at 22° C., which was gold powder.

Background Example 14 Dissolution of Gold Using Depleted Microorganism Medium

Materials and Methods:
Depleted nutrient broth media was obtained from the discarded supernatant of a pelleted microorganism culture (e.g. Example 1) and used to generate a chlorine-based lixiviant.
1. 100 mL of depleted media was charged with gaseous chlorine for 30 minutes prior to use.
2. Three 1 cm lengths (0.58 g) of cut RAM board pins were placed in the charged solution, and stirred for 1 hour at 300 rpm at 22° C.
3. The lixiviant was analysed for gold content by atomic absorption spectroscopy as per prior examples.

Results:
A precipitate formed during chlorination of depleted media, likely due to the chlorination of organic compounds present in the solution. Total gold content was reported as mg/L and used to calculate the lixiviant yield (Table 20). Accuracy of total gold content was estimated at 15-20% variance.

TABLE 20

| Sample | Au input (mg) | Au content reported (mg/L [ppm]) | Au dissolved (mg) | Yield (% Au input) |
|---|---|---|---|---|
| E-waste (depleted media lixiviant) | 1.88* | 12.5 | 1.25 (12.5 mg/L × 0.1L) | 66.5% |

*e-waste Au input estimated.

Background Example 15 Dissolution of Gold Using Recharged Lixiviant

Materials and Methods:
Depleted lixiviant was obtained from the discarded supernatant of a pelleted metal-laden microorganism culture (e.g. Example 6) and used to generate a chlorine-based lixiviant. The remaining concentration of gold in the depleted lixiviant was 27.8 mg/L (ppm).
1. 100 mL of depleted lixiviant was charged with gaseous chlorine for 30 minutes prior to use.
2. A 3.5 cm length (0.44 g) of cut RAM board pins was placed in the charged solution, and stirred for 1 hour at 300 rpm at 22° C.
3. The lixiviant was analysed for gold content by atomic absorption spectroscopy as per prior examples.

Results:
At reaction completion there appeared to be no visible metal left on the RAM pins. Total gold content was reported as mg/L and used to calculate the lixiviant yield (Table 21). Accuracy of total gold content was estimated at 15-20% variance.

TABLE 21

| Sample | Au input (mg) | Au content reported (mg/L [ppm]) | Less background Au (mg/L [ppm]) | Au dissolved (mg) | Yield (% Auinput) |
|---|---|---|---|---|---|
| E-waste (recharged lixiviant) | 2.19* | 59.0 | 31.2 (59.0 mg/L − 27.8 mg/L) | 3.12 (31.2 mg/L × 0.1 L) | 142% |

*e-waste Au input estimated.

The invention has been described herein, with reference to certain preferred embodiments, in order to enable the reader to practice the invention without undue experimentation. However, a person having ordinary skill in the art will readily recognise that many of the components and parameters may be varied or modified to a certain extent or substituted for known equivalents without departing from the scope of the invention. It should be appreciated that such modifications and equivalents are herein incorporated as if individually set forth. Titles, headings, or the like are provided to enhance the reader's comprehension of this document, and should not be read as limiting the scope of the present invention.

The entire disclosures of all applications, patents and publications, cited above and below, if any, are hereby incorporated by reference.

The reference to any prior art in this specification is not, and should not be taken as, an acknowledgment or any form of suggestion that that prior art forms part of the common general knowledge in the United States of America or any country in the world.

Throughout this specification and any claims which follow, unless the context requires otherwise, the words "comprise", "comprising" and the like, are to be construed in an inclusive sense as opposed to an exclusive sense, that is to say, in the sense of "including, but not limited to".

We claim:

1. A method of recovering one or more target metal(s) from electronic waste, the method comprising:
   (a) a pre-processing step comprising removing at least a portion of non-target material from the electronic waste, wherein the pre-processing step comprises a non-target metal leach to remove one or more non-target metals, to give pre-processed electronic waste;
   (b) a dissolving step comprising contacting the pre-processed electronic waste with a lixiviant such that at least a portion of the target metal(s) dissolve into the lixiviant to produce a pregnant solution comprising target metal(s) ions;
   (c) a biosorption step comprising contacting a microorganism with the pregnant solution such that at least a portion of the target metal(s) ions biosorb to the microorganism wherein the microorganism becomes metal laden and the pregnant solution becomes barren;
   (d) a separating step comprising substantially separating the metal laden microorganism from the barren solution; and
   (e) a recovery step comprising recovery of the target metal(s) from the metal laden microorganism.

2. The method of claim 1 wherein the target metal is gold.

3. The method of claim 1 wherein electronic waste comprises less than 5% of the target metal.

4. The method of claim 1 wherein the pre-processing step further comprises one or more unit operations selected from:
   chip removal;
   grinding to a preselected size;
   removal of certain density fractions; and/or
   removal of magnetic material.

5. The method of claim 1 wherein the pre-processing step includes grinding.

6. The method of claim 1 wherein the non-target metal leach comprises treating the electronic waste with a leaching agent comprising nitric acid, sulfuric acid, and/or hydrochloric acid.

7. The method of claim 1 wherein the lixiviant dissolves the target metal(s) selectively over non-target metal(s).

8. The method of claim 1 wherein the lixiviant solution is a thiourea-based aqueous solution, or a thiosulphate-based aqueous solution, or a thiocyanate-based aqueous solution, or a cyanide-based aqueous solution, or a halogen-based aqueous solution, or an aqua regia-based solution.

9. The method of claim 1 wherein the concentration factor of the target metal from the pregnant solution to the microorganism is greater than 5.

10. The method of claim 1 wherein the microorganism is a Gram-negative or Gram-positive bacteria.

11. The method of claim 1 wherein the non-target material includes one or more non-target metal(s) the microorganism selectively biosorbs the target metal(s) over the non-target metal(s) in the biosorption step and the non-target metal(s) remains in the barren solution in the separating step.

12. The method of claim 1 wherein the separation step includes at least one of:
   gravity separation of the metal laden microorganism from the barren solution and removal of the barren solution;
   centrifugation and removal of the barren solution;
   filtration of the metal laden microorganism from the barren solution.

13. The method of claim 12 wherein at least 60% of the barren solution is removed.

14. The method of claim 1 wherein the recovery step comprises contacting the metal laden microorganism with a condition which triggers the microorganism to substantially desorb the target metal(s) or burning or chemical dissolution of the metal laden microorganism to desorb the target metal(s).

15. The method of claim 1 wherein the method includes a filtering step following the dissolving step to remove at least a portion of undissolved non-target material from the pregnant solution.

* * * * *